United States Patent
Friedrich et al.

(10) Patent No.: US 9,046,383 B2
(45) Date of Patent: Jun. 2, 2015

(54) SYSTEMS AND METHODS THAT USE MAGNETIC FIELD SENSORS TO IDENTIFY POSITIONS OF A GEAR SHIFT LEVER

(75) Inventors: Andreas P. Friedrich, Metz-Tessy (FR); Andrea Foletto, Annecy (FR); Cedric Gillet, Annecy (FR)

(73) Assignee: Allegro Microsystems, LLC, Worcester, MA (US)

( * ) Notice: Subject to any disclaimer, the term of this patent is extended or adjusted under 35 U.S.C. 154(b) by 417 days.

(21) Appl. No.: 13/484,316

(22) Filed: May 31, 2012

(65) Prior Publication Data

US 2013/0179115 A1 Jul. 11, 2013

Related U.S. Application Data

(60) Provisional application No. 61/584,369, filed on Jan. 9, 2012.

(51) Int. Cl.
*G01R 33/09* (2006.01)
*G01D 5/14* (2006.01)
*F16H 59/70* (2006.01)
*F16H 59/04* (2006.01)

(52) U.S. Cl.
CPC .............. *G01D 5/145* (2013.01); *F16H 59/70* (2013.01); *G01D 5/147* (2013.01); *F16H 59/044* (2013.01)

(58) Field of Classification Search
CPC ....... F16H 59/044; F16H 59/70; G01D 5/145; G01D 5/147
USPC ............... 702/150; 74/473.1, 473.3; 180/336; 324/207.2, 207.16, 207.23, 207.24, 324/207.21, 207.12
See application file for complete search history.

(56) References Cited

U.S. PATENT DOCUMENTS

| | | | |
|---|---|---|---|
| 4,668,914 A | 5/1987 | Kersten et al. | |
| 4,761,569 A | 8/1988 | Higgs | |
| 4,829,352 A | 5/1989 | Popovic et al. | |
| 5,541,506 A | 7/1996 | Kawakita et al. | |
| 5,572,058 A | 11/1996 | Biard | |
| 5,612,618 A | 3/1997 | Arakawa | |
| 5,619,137 A | 4/1997 | Vig et al. | |

(Continued)

FOREIGN PATENT DOCUMENTS

| DE | 10 2005 014 509 B4 | 10/2006 |
|---|---|---|
| DE | 10 2006 037 226 A1 | 2/2008 |

(Continued)

OTHER PUBLICATIONS

Allegro Microsystems, Inc.; "A1140/41/42/43 Data Sheet: Senstitive Two-Wire Chopper-Stablilized Unipolar Hall-Effect Switches;" published Sep. 9, 2004; pp. 1-11.

(Continued)

*Primary Examiner* — Carol S Tsai
(74) *Attorney, Agent, or Firm* — Daly, Crowley, Mofford & Durkee, LLP

(57) ABSTRACT

A system and an associated method provide an ability to sense, with a magnetic field sensor, a position of a plurality of gears (and neutral) selected by a gear shift lever of a vehicle. In some embodiments, the system and method use a ferromagnetic target having features, positions of which can be sensed by the magnetic field sensor. In other embodiments, the system and method use a magnet having features and characteristics that can be sensed by the magnetic field sensor.

48 Claims, 20 Drawing Sheets

(56) References Cited

U.S. PATENT DOCUMENTS

| | | |
|---|---|---|
| 5,621,319 A | 4/1997 | Bilotti et al. |
| 5,657,189 A | 8/1997 | Sandhu |
| 5,694,038 A | 12/1997 | Moody et al. |
| 5,831,513 A | 11/1998 | Lue |
| 5,844,411 A | 12/1998 | Vogt |
| 5,942,895 A | 8/1999 | Popovic et al. |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,166,535 A | 12/2000 | Irle et al. |
| 6,232,768 B1 | 5/2001 | Moody et al. |
| 6,236,199 B1 | 5/2001 | Irle et al. |
| 6,265,864 B1 | 7/2001 | De Winter et al. |
| 6,288,533 B1 | 9/2001 | Haeberli et al. |
| 6,297,627 B1 | 10/2001 | Towne et al. |
| 6,339,325 B1 | 1/2002 | Oda et al. |
| 6,356,741 B1 | 3/2002 | Bilotti et al. |
| 6,525,531 B2 | 2/2003 | Forrest et al. |
| 6,542,068 B1 | 4/2003 | Drapp et al. |
| 6,545,462 B2 | 4/2003 | Schott et al. |
| 6,605,939 B1 * | 8/2003 | Jansseune et al. ....... 324/207.16 |
| 6,622,012 B2 | 9/2003 | Bilotti et al. |
| 6,768,301 B1 | 7/2004 | Hohe et al. |
| 6,969,988 B2 | 11/2005 | Kakuta et al. |
| 7,030,606 B2 | 4/2006 | Kato et al. |
| 7,038,448 B2 | 5/2006 | Schott et al. |
| 7,085,119 B2 | 8/2006 | Bilotti et al. |
| 7,119,538 B2 | 10/2006 | Blossfeld |
| 7,159,556 B2 | 1/2007 | Yoshihara |
| 7,235,968 B2 | 6/2007 | Popovic et al. |
| 7,259,556 B2 | 8/2007 | Popovic et al. |
| 7,307,824 B2 | 12/2007 | Bilotti et al. |
| 7,319,319 B2 | 1/2008 | Jones et al. |
| 7,362,094 B2 | 4/2008 | Voisine et al. |
| 7,648,153 B2 * | 1/2010 | Metternich et al. ........... 280/433 |
| 7,714,570 B2 | 5/2010 | Thomas et al. |
| 7,746,065 B2 | 6/2010 | Pastre et al. |
| 7,759,929 B2 | 7/2010 | Forsyth |
| 7,829,805 B2 * | 11/2010 | Ersoy et al. ................ 200/61.88 |
| 7,872,322 B2 | 1/2011 | Schott et al. |
| 7,911,203 B2 | 3/2011 | Thomas et al. |
| 7,965,076 B2 | 6/2011 | Schott |
| 7,994,774 B2 | 8/2011 | Thomas et al. |
| 8,350,663 B1 * | 1/2013 | Michael ....................... 338/288 |
| 8,739,647 B2 * | 6/2014 | Benson et al. ................ 74/473.1 |
| 8,746,104 B2 * | 6/2014 | Benson et al. ................ 74/473.1 |
| 8,793,085 B2 * | 7/2014 | Donovan et al. ................ 702/57 |
| 2005/0040814 A1 * | 2/2005 | Vig et al. ...................... 324/179 |
| 2005/0126322 A1 | 6/2005 | Kozaki et al. |
| 2005/0258820 A1 | 11/2005 | Forster |
| 2005/0286155 A1 * | 12/2005 | Tagami et al. ............. 360/77.08 |
| 2006/0011999 A1 | 1/2006 | Schott et al. |
| 2006/0145450 A1 * | 7/2006 | Metternich et al. ........... 280/433 |
| 2007/0029998 A1 | 2/2007 | Popovic et al. |
| 2008/0078604 A1 * | 4/2008 | Ersoy et al. .................... 180/336 |
| 2009/0121707 A1 | 5/2009 | Schott |
| 2009/0174395 A1 | 7/2009 | Thomas et al. |
| 2009/0320633 A1 * | 12/2009 | Knysch ........................ 74/473.3 |
| 2010/0156397 A1 | 6/2010 | Yabusaki et al. |
| 2010/0164491 A1 | 7/2010 | Kejik et al. |
| 2011/0148398 A1 | 6/2011 | Yang et al. |
| 2011/0248708 A1 | 10/2011 | Thomas et al. |
| 2011/0267040 A1 * | 11/2011 | Frachon .................... 324/207.2 |
| 2012/0152049 A1 * | 6/2012 | Benson et al. ............... 74/473.3 |
| 2012/0217955 A1 * | 8/2012 | Petrie ......................... 324/207.2 |
| 2013/0046488 A1 * | 2/2013 | Donovan et al. ................ 702/57 |

FOREIGN PATENT DOCUMENTS

| | | |
|---|---|---|
| DE | 10 2007 050 531 A | 4/2009 |
| EP | 0 631 416 B1 | 12/1994 |
| EP | 0 875 733 B1 | 11/1998 |
| EP | 0 916 074 B1 | 5/1999 |
| EP | 1 450 136 A2 | 8/2004 |
| EP | 2 000 814 A2 | 12/2008 |
| EP | 2 200 814 A2 | 12/2008 |
| FR | 2 954 284 | 6/2011 |
| JP | 58-055688 A | 4/1983 |
| JP | 2003-042709 | 2/2003 |
| JP | 2005-241269 | 9/2005 |
| JP | 2010-014607 | 1/2010 |
| JP | 2010-078366 | 4/2010 |
| WO | WO 98/10302 | 3/1998 |
| WO | WO 98/54547 | 12/1998 |
| WO | WO 00/02266 | 1/2000 |
| WO | WO 03/036732 A2 | 5/2003 |
| WO | WO 2004/025741 A1 | 3/2004 |
| WO | WO 2006/056289 A1 | 6/2006 |
| WO | WO 2006/074989 A2 | 7/2006 |
| WO | WO 2008/145662 | 12/2008 |
| WO | WO 2008/145662 A1 | 12/2008 |
| WO | WO 2008 145662 A1 | 12/2008 |
| WO | WO 2009/052976 | 4/2009 |
| WO | WO 2009/124969 A1 | 10/2009 |

OTHER PUBLICATIONS

Allegro Microsystems, Inc.; "A1174 Data Sheet: Ultrasensitive Hall Effect Latch with Internally or Externally Controlled Sample and Sleep Periods for Track Ball and Scroll Wheel Applications;" published Jul. 25, 2008; pp. 1-13.

Allegro Microsystems, Inc.; "A1230 Data Sheet: Ultra-Sensitive Dual-Channel Quadrature Hall-Effect Bipolar Switch;" published Mar. 26, 2010; 16 sheets.

Allegro Microsystems, Inc.; "A1351 Data Sheet: High Precision Linear Hall Effect Sensor with a Push/Pull, Pulse Width Modulated Output;" published Mar. 7, 2008; pp. 1-23.

Allegro Microsystems, Inc.; "A1360, A1361 and A1362 Data Sheet: Low-Noise Programmable Linear Hall Effect Sensors with Adjustable Bandwidth (50 kHz Maximum) and Analog Output;" published Mar. 18, 2008; pp. 1-25.

Allegro Microsystems, Inc.; "A3212 Data Sheet: Micropower, Ultra-Sensitive Hall-Effect Switch;" published Sep. 22, 2004; pp. 1-12.

Allegro Microsystms, Inc.; "ATS675LSE Data Sheet: Self-Calibrating TPOS Speed Sensor Optimized for Automotive Cam Sensing Applications;" published Jul. 11, 2008; pp. 1-13.

Allegro Microsystems, Inc.; "27701-AN Data Sheet: Hall-Effect IC Applications Guide;" Application Information, Rev. 2; http://www.allegromicro.com/en/products/design/hall-effect-sensor-ic-applications-guide/AN27701.pdf; downloaded Sep. 29, 2010; pp.1-40.

Allegro Microsystems, Inc.; "3235 Data Sheet 37633A, Dual-Output Hall-Effect Switch;" http://www.dataheetcatalog.org/datasheets/90/205047_DS.pdf; downloaded Sep. 29, 2010; 6 sheets.

Allegro Microsystems, Inc.; "A3425 Data Sheet: Dual, Chopper-Stabilized, Ultra-Sentsitive Bipolar Hall-Effect Switch;" published Jun. 28, 2002; pp. 1-10.

Atherton et al.; "Sensor Signal Conditioning—an IC Designer's Perspective;" IEEE Electro International; Apr. 26-28, 1991; pp. 129-134.

Austria Microsystems; "AS5040 datasheet; 10-Bit Programmable Magnetic Rotary Encoder;" Revision 1.1; Jan. 2004; pp. 1-20.

Banjevic et al; "2D CMOS Integrated Magnetometer Based on the Miniaturized Circular Vertical Hall Device;" International Solid-State Sensors, Actuators and Microsystems Conference; Transducers; Jun. 21-25, 2009; pp. 877-880.

Blanchard et al.; "Cylindrical Hall Device;" International Electron Devices Meeting; Dec. 8-11, 1996; pp. 541-544.

Burger et al.; "New fully integrated 3-D silicon Hall sensor for precise angular-postition measurements;" Sensors and Actuators, A 67; May 1998; pp. 72-76.

Dwyer; "Allegro Microsystems, Inc.; AN296061 Data Sheet: Ring Magnet Speed Sensing for Electronic Power Steering;" published Jul. 21, 2009; pp. 1-4.

Freitas et al.; "Giant magnetoresistive sensors for rotational speed control;" Journal of Applied Physics, vol. 85, No. 8, Apr. 15, 1999; pp. 5459-5461.

Gilbert; "Technical Advances in Hall-Effect Sensing;" Allegro Microsystems, Inc. Product Description; May 10, 2008; 7 sheets.

(56) References Cited

OTHER PUBLICATIONS

Häberli et al.; "Contactless Angle Measurements by CMOS Magnetic Sensor with On Chip Read-Out Circuit;" The 8th International Conference on Solid-State Sensors and Actuators and Eurosensors IX; Jan. 25-29, 1995; pp. 134-137.

Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; pp. 1902-1907.

Hiligsmann et al.; "Monolithic 360 Degrees Rotary Position Sensor IC;" 2004 IEEE Proceedings of Sensors, vol. 3; Oct. 24-27, 2004; pp. 1137-1142.

Kejik et al.; "Circular Hall Transductor for Angular Position Sensing;" International Solid-State Sensors, Actuators and Microsystems Conference; Transducers; Jun. 2007; pp. 2593-2596.

Lou Law; "Angle Position Sensing with 2-Axis Hall ICs;" Sensors Magazine, vol. 20, No. 3; Mar. 2003; 7 sheets.

Masson et al.; "Multiturn and high precision through-shaft magnetic sensors;" Sensor + Text Conference; Proceedings II; May 2009; pp. 41-46.

Metz et al.; "Contactless Angle Measurements Using Four Hall Devices on Single Chip;"; International Conference on Solid State Sensors and Actuators; Transducers; vol. 1; Jun. 16-19, 1997; pp. 385-388.

Munter; "A Low-offset Spinning-current Hall Plate;" Sensors and Actuatos, vol. A21-A23; Jan. 1990; pp. 743-746.

Novotechnik Siedle Group; "How New Angular Positioning Sensor Technology Opens a Broad Range of New Applications;" Vert-X Technology; Dec. 2001; pp. 1-5.

Paranjape et al.; "A CMOS-compatible 2-D vertical Hall magnetic-field sensor using active carrier confinement and post-process micromachining; " The 8th International Conference on Solid-State Sensors and Acutators, Physical vol. 53, Issues 1-3; May 1996; pp. 278-283.

Petoussis et al.; "A Novel Hall Effect Sensor Using Elaborate Offset Cancellation Method;" Sensors & Tranducers Journal, vol. 100, Issue 1; Jan. 2009; pp. 85-91.

Popovic; "Not-plate-like Hall magnetic sensors and their applications;" Sensors and Actuators A: Physical, vol. 85, Issues 1-3; Aug. 2000; pp. 9-17.

Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; pp. 55-58.

Roumenin; "Magnetic sensors continue to advance towards perfection;" Sensors and Actuators A: Physical, vol. 46-47, Issues 1-3; Jan.-Feb. 1995; pp. 273-279.

Schneider et al.; "Temperature Calibration of CMOS Magnetic Vector Probe for Contactless Angle Measurement System;" International Electron Devices Meeting; Dec. 8-11, 1996; pp. 533-536.

Sensima technology sa; "CVHD: a new concept of Angular Position Sensor;" Slide Presentation for Allegro Microsystems; Mar. 2009; 17 sheets.

Sentron; AN-101; "Angular position sensing with 2-Axis Hall IC 2SA-10;" Feb. 12, 2004; http://www.diegm.uniud.it/petrella/Azionamenti%20Eleltrici%20ll/Sensori%20e%trasduttori/Data%20Sheet%20-%202SA-10.pdf; pp. 1-7.

Van der Meer; et al; "CMOS quad spinning-current Hall-sensor system for compass application;" IEEE Proceedings of Sensors, vol. 3; Oct. 24-27, 2004; pp. 1434-1437.

Vogelgesand et al.; Robert Bosch GmbH; "GMR sensors in automotive application;" CS-SNS/ECS Slides Presentation; Mar. 2, 2005; 16 sheets.

Volder; "The CORDIC Trigonometric Computing Technique;" The Institute of Radio Engineers, Inc.; IRE Transactions on Electronic Computers, vol. EC, Issue 3; Sep. 1959; pp. 226-230.

Banjevic; "High Bandwidth CMOS Magnetic Sensors Based on the Miniaturized Circular Vertical Hall Device;" Sep. 2011; 153 pagesp.

PCT Invitation to Pay Additional Fees and Partial Search Report of the ISA; dated Jul. 8, 2013; for PCT Pat. App. No. PCT/US2012/068925; 6 pages.

Melexis Microelectronic Integrated Systems; MLX90333; "Triaxis 3D-Joystick Postion Sensor;" Data Sheet; Mar. 2009; 43 pages.

Melexis Microelectronic Integrated System; MLX 90324; ""Under-the-Hood" Triaxis Rotary Position feat. SENT Protocl; " Data Sheet; Dec. 2008; 40 pages.

Friedrich; "Differential Magnetic Field Sensor Structure for Orientation Independent Measurement;" U.S. Appl. No. 13/078,200, filed Apr. 1, 2011; 66 pages.

Friedrich et al.; "Magnetic Field Sensing Element Combining a Circular Vertical Hall Magnetic Field Sensing Element with a Planar Hall Element;" U.S. Appl. No. 13/226,694, filed Sep. 7, 2011.

PCT International Preliminary Report on Patentability with Written Opinion for PCT/US2012/068925 dated Jul. 24, 2014 12 pages.

PCT Search Report and Written Opinion of the ISA dated Nov. 11, 2013; for PCT Pat. App. No. PCT/US2012/268925; 17 pages.

Melexis MLX 90324; "Under-the-Hood" Triaxis Rotary Position feat. SENT Protocol; 3901090324 Data Sheet; Dec. 2008; 40 pages.

Petrie; "Circular Vertioal Hall Magnetic Field Sensing Element and Method with a Plurality of Continuous Output Signals;" U.S. Appl. No. 13/035,243, filed Feb. 25, 2011; 56 pages.

Drijaca, et al.; "Nonlinear Effects in Magnetic Angular Position Sensor With Integrated Flux Concentrator;" Proc. 23rd International Conference on Microelectronics (MIEL 2002); vol. 1; NIS; Yugoslavia; May 12-15, 2002; pp. 223-226.

Baschirotto et al.; "Development and Analysis of a PCB Vector 2-D Magnetic Field Sensor System for Electronic Compasses;" IEEE Sensors Journal, vol. 6, No. 2; Apr. 2006; pp. 365-371.

Kejik, et al.; "Purley CMOS Angular Position Sensor Based on a New Hall Microchip;" 34th Annual Conference of IEEE Industrial Electronics; IECON; Nov. 10-13, 2008; pp. 1777-1781.

Kujik,.et al.; "Ultra Low-Power Angular Position Sensor for High-Speed Portable Applications;" 2009 IEEE Sensors Conference; Oct. 25-28, 2009; pp. 173-176.

Reymond, et al.; "True 2D CMOS Integrated Hall Sensor;" 2007 IEEE Sensors Conference; Oct. 28-31, 2007; pp. 860-863.

Gerhauser; "Intelligente 3D-Magnetfeld Snesorik;" Fraunhofer-Institut for Integrierte Schaltungen IIS; www.iis.fraunhofer.de/asic/analog; Oct. 2009; 2 pages.

Melexis Microelectronic Integrated Systems; MLX90333; "Traixis 3D-Joystick Position Sensor;" Data Sheet; Mar. 2009; 43 pages.

MEMSIC Corporation; AN-00MM-004; "Electronic Tilt Compensation;" Mar. 2008; 5 pages.

MEMSIC Corporation; AN-00MM-003; "Magnetic Sensor Calibration;" Mar. 2008; 5 pages.

MEMSIC Corporation; AN-00MM-002; "Magnetometer Soldering Methodology;" Jun. 2008; 2 pages.

MEMSIC Corporation; AN-00MM-001; "Magnetometer Fundamentals;" Jun. 2008; 6 pages.

MEMSIC Corporation; AN-00MM-005; "Magnetic Sensor Placement Guidelines;" Oct. 2008; 2 pages.

MEMSIC Corporation; MMC312xMQ; "Tri-axis Magnetic Sensor, with I² C Interface; " Aug. 14, 2008; 9 pages.

MEMSIC Corporation; MMC314xMS; "Ultra Small 3-axis Magnetic Sensor, with I² C Interface;" Mar. 31, 2010; 8 pages.

Micronas GmbH; "HAL® 3625 Programmable Direct Angle Sensor;" Product Information; Sep. 2009; 2 pages.

European Response Official Communication under Rule 161(1) and 162 dated Feb. 9, 2015; for European Pat. App. No. 12809923.1; 20 pages.

* cited by examiner

|    | R | 1 | 2 | 3 | 4 | 5 | 6 | N |
|----|---|---|---|---|---|---|---|---|
| H1 | 0 | 1 | 0 | 1 | 0 | 1 | 0 | 1 |
| H2 | 0 | 0 | 1 | 1 | 1 | 0 | 0 | 1 |
| H3 | 0 | 0 | 0 | 0 | 1 | 1 | 1 | 1 |

|    | R | 1 | 2 | 3 | 4 | 5 | 6 | N |
|----|---|---|---|---|---|---|---|---|
| H1 | 1 | 0 | 0 | 1 | 0 | 1 | 0 | 1 |
| H2 | 0 | 1 | 0 | 1 | 0 | 1 | 1 | 1 |
| H3 | 1 | 0 | 0 | 0 | 1 | 0 | 1 | 1 |
| H4 | 0 | 0 | 1 | 0 | 1 | 1 | 1 | 1 |

| Gear | Rule: |
|------|-------|
| R | D12>0 and D34>0 |
| 1 | D12<0 and D24>0 |
| 2 | D34<0 and D24<0 |
| 3 | D13>0 and D24>0 |
| 4 | D13<0 and D24<0 |
| 5 | D13>0 and D34<0 |
| 6 | D13<0 and D12<0 |
| N | D13≈0 and D13≈0 and D24≈0 and D34≈0 |

|     |   | D2-D4 | D1-D3 | D1-D2 | D2-D3 | D3-D4 | D4-D1 | D2-D3+D4-D1 |
|-----|---|-------|-------|-------|-------|-------|-------|-------------|
| Gear | R | <0   |       | >0    |       |       | <0    |             |
| Gear | 1 |       | >0    | <0    | >0    |       |       |             |
| Gear | 2 | <0    |       |       | <0    | >0    |       |             |
| Gear | 3 | >0    |       | >0    |       |       | <0    |             |
| Gear | 4 |       | <0    |       |       | <0    | >0    |             |
| Gear | 5 |       | <0    | <0    | >0    |       |       |             |
| Gear | 6 | >0    |       |       | <0    | >0    |       |             |
| Gear | 7 |       | >0    |       |       | <0    | >0    |             |
| Gear | N |       |       | =0    |       | =0    |       | =0          |
|      |   |       |       |       |       |       |       |             |
|      |   |       |       |       |       |       |       |             |
| Opp  | N |       |       | =0    | =0    | =0    | =0    |             |

|  |  | Anticipation Rule | | | | | | | Final Position Rule | | | | | |
|---|---|---|---|---|---|---|---|---|---|---|---|---|---|---|
|  |  | D2-D4 | D1-D3 | D1-D2 | D2-D3 | D3-D4 | D4-D1 | D2-D3+D4-D1 | D1-D2 | D2-D3 | D3-D4 | D4-D1 | D2-D3+D4-D1 |
| Gear | R | >0 |  |  |  | <0 | >0 |  | =0 | <0 | =0 | <0 | =0 |
| Gear | 1 | <0 |  |  | <0 | >0 |  |  | =0 | <0 | =0 | <0 | =0 |
| Gear | 2 |  | >0 | <0 | >0 |  |  |  | =0 | >0 | =0 | <0 | =0 |
| Gear | 3 |  | <0 | >0 |  | <0 | >0 |  | =0 | <0 | =0 | <0 | =0 |
| Gear | 4 | >0 |  | <0 | <0 |  | <0 |  | =0 | <0 | =0 | <0 | =0 |
| Gear | 5 | >0 |  | >0 | >0 | >0 |  |  | =0 | >0 | =0 | <0 | =0 |
| Gear | 6 |  | <0 | <0 |  |  | <0 |  | =0 | <0 | =0 | <0 | =0 |
| Gear | 7 | <0 |  | >0 |  |  |  |  | =0 | >0 | =0 | <0 |  |
| Gear | N |  |  | =0 | =0 | =0 | =0 |  | =0 | =0 | =0 | =0 |  |

*FIG. 7A*

| Gear | Anticipation Rule | | | | | | | Final Rule | | | | | | |
|---|---|---|---|---|---|---|---|---|---|---|---|---|---|---|
| | D2-D4 | D1-D3 | D1-D2 | D2-D3 | D3-D4 | D4-D1 | D2-D3+D4-D1 | D2-D4 | D1-D3 | D1-D2 | D2-D3 | D3-D4 | D4-D1 | D2-D3+D4-D1 |
| R | | >0 | | | <0 | >0 | | | >0 | | | <0 | >0 | |
| 1 | <0 | | | <0 | >0 | | | <0 | | | <0 | >0 | | |
| 2 | | >0 | <0 | >0 | | >0 | | | >0 | <0 | >0 | | >0 | |
| 3 | | <0 | >0 | | <0 | <0 | | | <0 | >0 | | <0 | <0 | |
| 4 | >0 | | | <0 | >0 | | | >0 | | | <0 | >0 | | |
| 5 | >0 | | <0 | >0 | | | | >0 | | <0 | >0 | | | |
| 6 | | <0 | >0 | | | <0 | | | <0 | >0 | | | <0 | |
| 7 | <0 | | | | | <0 | | <0 | | | | | <0 | |
| N | | | =0 | =0 | =0 | =0 | | | | =0 | =0 | =0 | | |

*FIG. 8A*

| | | D1-D3 | D2-D4 | \|D1-D3\|-\|D2-D4\| |
|---|---|---|---|---|
| Gear | R | >0 | <0 | <0 |
| Gear | 1 | >0 | >0 | >0 |
| Gear | 2 | <0 | >0 | >0 |
| Gear | 3 | >0 | <0 | >0 |
| Gear | 4 | <0 | <0 | >0 |
| Gear | 5 | >0 | >0 | <0 |
| Gear | 6 | <0 | >0 | <0 |
| Gear | 7 | <0 | <0 | <0 |
| Gear | N | ≠0 | =0 | |

|  |  | vertical hall | Differential |  |
|---|---|---|---|---|
| Gear | R | >0 | >0 |  |
| Gear | 1 | >0 | =0 |  |
| Gear | 2 | <0 | =0 |  |
| Gear | 3 | =0 | >0 |  |
| Gear | 4 | =0 | <0 |  |
| Gear | 5 | >0 | <0 |  |
| Gear | 6 | <0 | >0 |  |
| Gear | 7 |  |  |  |
| Gear | N | =0 | =0 |  |

FIG. 16

| | | angle |
|---|---|---|
| Gear | R | 67.5 |
| Gear | 1 | 157.5 |
| Gear | 2 | 202.5 |
| Gear | 3 | 22.5 |
| Gear | 4 | 337.5 |
| Gear | 5 | 112.5 |
| Gear | 6 | 247.5 |
| Gear | 7 | 292.5 |
| Gear | N | No angle |

FIG. 17A

| | | D1-D3 | D2-D4 | |D1-D3|-|D2-D4| |
|---|---|---|---|---|
| Gear | R | >A1 | <B5 | <B9 |
| Gear | 1 | >A2 | >A5 | >A9 |
| Gear | 2 | <B1 | >A6 | >A10 |
| Gear | 3 | >A3 | <B6 | >A11 |
| Gear | 4 | <B2 | >A7 | >A12 |
| Gear | 5 | >A4 | <B7 | <B10 |
| Gear | 6 | <B3 | >A8 | <B11 |
| Gear | 7 | <B4 | <B8 | <B12 |
| Gear | N | ≠C1 | =C2 | |

SYSTEMS AND METHODS THAT USE MAGNETIC FIELD SENSORS TO IDENTIFY POSITIONS OF A GEAR SHIFT LEVER

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic field sensors and, more particularly, to systems and methods that use a magnetic field sensor to identify a plurality of gears selected by a gear shift lever.

BACKGROUND OF THE INVENTION

Planar Hall elements and vertical Hall elements are known types of magnetic field sensing elements that can be used in magnetic field sensors. A planar Hall element tends to be responsive to magnetic field perpendicular to a surface of a substrate on which the planar Hall element is formed. A vertical Hall element tends to be responsive to magnetic field parallel to a surface of a substrate on which the vertical Hall element is formed.

Other types of magnetic field sensing elements are known. For example, a so-called "circular vertical Hall" (CVH) sensing element, which includes a plurality of vertical magnetic field sensing elements, is known and described in PCT Patent Application No. PCT/EP2008/056517, entitled "Magnetic Field Sensor for Measuring Direction of a Magnetic Field in a Plane," filed May 28, 2008, and published in the English language as PCT Publication No. WO 2008/145662, which application and publication thereof are incorporated by reference herein in their entirety. The CVH sensing element is a circular arrangement of vertical Hall elements arranged over a common circular implant region in a substrate. The CVH sensing element can be used to sense a direction (and optionally a strength) of a magnetic field in a plane of the substrate.

Various parameters characterize the performance of magnetic field sensing elements. These parameters include sensitivity, which is a change in an output signal of a magnetic field sensing element in response to a change of magnetic field experienced by the magnetic sensing element, and linearity, which is a degree to which the output signal of the magnetic field sensing element varies in direct proportion to the magnetic field. These parameters also include an offset, which is characterized by an output signal from the magnetic field sensing element not representative of a zero magnetic field when the magnetic field sensing element experiences a zero magnetic field.

Another parameter that can characterize the performance of a CVH sensing element is the speed with which output signals from vertical Hall elements within the CVH sensing element can be sampled, and thus, the speed with which a direction of a magnetic field can be identified. Yet another parameter that can characterize the performance of a CVH sensing element is the resolution (e.g., angular step size) of the direction of the magnetic field that can be reported by the CVH sensing element.

Particularly in an automobile, systems that can sense a neutral position of a gear shift lever used in a manual transmission are known. By sensing the neutral position, the engine control processor of some automobiles shuts off the engine when the neutral position is selected, for example, as may be selected when sitting at a stoplight. Thereafter when the user steps on the clutch pedal and selects a gear, which is not neutral, the engine control processor starts the engine again. Such systems are called stop-start systems, and are used to improve overall gas mileage and to reduce $CO_2$ emissions. These conventional systems sense only the neutral position of the gear shift lever.

It would be desirable to provide an automobile system that can sense not only the neutral position of the gear shift lever but all the gears that can be selected by the gear shift lever, particularly of a manual automobile transmission as opposed to an automatic automobile transmission.

SUMMARY OF THE INVENTION

The present invention provides an electronic automobile system that can sense not only the neutral position of a gear shift lever but more of or all of the gears that can be selected by a gear shift lever. The automobile transmission can be a manual transmission, but also an automatic transmission.

In accordance with one aspect of the present invention, a system for identifying a position of a gear shift lever includes a magnetic field sensor comprising two or more magnetic field sensing elements. The two or more magnetic field sensing elements are configured to generate two or more magnetic field signals in response to a magnetic field. The system further includes a target comprising a selected one of a ferromagnetic target or a magnet. The target is disposed proximate to the magnetic field sensor. Either the magnetic field sensor or the target is configured to couple to the gear shift lever. The gear shift lever is configured to move to select from among a plurality of gears. The other one of the magnetic field sensor or the target is configured to couple to a structure stationary with respect to the gear shift lever. The target includes selected characteristics such that the two or more magnetic field signals have different respective magnetic field signal values when the gear shift lever selects different ones of the plurality of gears. The system further includes an electronic circuit coupled to receive the two or more magnetic field signals and configured to generate an output signal indicative of selected ones of the plurality of gears selected by the gear shift lever.

In accordance with another aspect of the present invention, a method of identifying a position of a gear shift lever includes providing a magnetic field sensor comprising two or more magnetic field sensing elements. The two or more magnetic field sensing elements are configured to generate two or more magnetic field signals in response to a magnetic field. The method also includes providing a target comprising a selected one of a ferromagnetic target or a magnet. The target is disposed proximate to the magnetic field sensor. The method also includes coupling either the magnetic field sensor or the target to the gear shift lever. The gear shift lever is configured to move to select from among a plurality of gears. The method also includes coupling the other one of the magnetic field sensor or the target to a structure stationary with respect to the gear shift lever. The target includes selected characteristics such that the two or more magnetic field signals have different respective magnetic field signal values when the gear shift lever selects different ones of the plurality of gears. The method further includes providing an electronic circuit coupled to receive the two or more magnetic field signal and configured to generate an output signal indicative of selected ones of the plurality of gears selected by the gear shift lever.

BRIEF DESCRIPTION OF THE DRAWINGS

The foregoing features of the invention, as well as the invention itself may be more fully understood from the following detailed description of the drawings, in which:

FIG. 7A is an exemplary rules table that can be used in conjunction with the ferromagnetic target of FIG. 7;

FIG. 8A is an exemplary rules table that can be used in conjunction with the ferromagnetic target of FIG. 8;

FIG. 16 is an exemplary rules table that can be used in conjunction with the ferromagnetic target and the CVH sensing element of FIG. 13;

FIG. 17A is an exemplary rules table that can be used in conjunction with the ferromagnetic target of FIG. 17;

DETAILED DESCRIPTION OF THE INVENTION

Before describing the present invention, some introductory concepts and terminology are explained. As used herein, the term "sensing element" is used to describe a variety of types of electronic elements that can sense a characteristic of the environment. For example, sensing elements include, but are not limited to, pressure sensing elements, temperature sensing elements, motion sensing elements, light sensing elements, acoustic sensing elements, and magnetic field sensing elements.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

While Hall elements (and CVH sensing elements) are described in examples below, in other embodiments, another type of magnetic field sensing element can be used.

Figure 1:
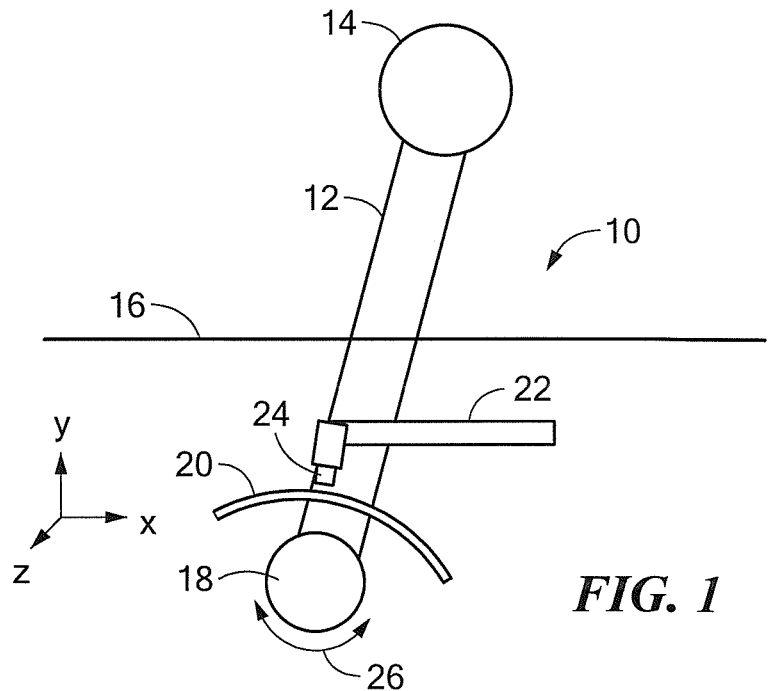
FIG. 1 is a side view of a gearshift lever, a ferromagnetic target attached to the gear shift lever, and a magnetic field sensor proximate to the ferromagnetic target.

Referring now to FIG. 1, a gear shift arrangement 10 is associated with a gear shift lever 12 as may be used in any type of vehicle, including, but not limited to automobiles, trucks, and boats. The gear shift lever 12 has a knob 14 at an end thereof that a user can move with his or her hand in order to move the gear shift lever 12 such that the gear shift lever 12 can swivel about a feature 18 in at least two axes, for example, x and z axes as shown. An arrow 26 is representative of only one of the axes, the z axis, about which the gear shift lever can swivel or rotate.

The gear shift lever 12 can be supported by a structure, for example, an automobile console 16.

A ferromagnetic target 20 can be coupled to the gear shift lever 12. A magnetic field sensor 24 can be coupled to a structure 22 that is stationary relative to the gear shift lever 12 as the gear shift lever 12 is moved by a user. The magnetic field sensor 24 is responsive to a movable position of the ferromagnetic target 20, and therefore, a position of the gear shift lever 12.

The ferromagnetic target 20 has a shape and features, described more fully below, that allow the magnetic field sensor 24 to identify the position of the gear shift lever 12 in all or nearly all of the gear positions it can take as the user selects different gears. Here it is shown in a side view that the ferromagnetic target, in one aspect of the shape of the ferromagnetic target 20, can have a curve. While the curve is shown to be substantially regular and round, in other embodiments the ferromagnetic target 20 can have, from the side view, other curves, including irregular curves. In still other embodiments, the ferromagnetic target 20, in a side view, can be flat and have no curve. However, it will be understood that it is desirable to maintain a constant distance between the magnetic field sensor 24 and the ferromagnetic target 20 as the gear shift lever moves and swivels about two axes. Thus, while the ferromagnetic target 20 is shown to be curved from a side view about only one axis, e.g., the z-axis, the ferromagnetic target can also be curved about another axis, e.g., the x-axis.

The shape and various associated features of the ferromagnetic target 20 are described more fully below in conjunction with many figures.

While it is described above that the ferromagnetic target 20 is coupled to the gear shift lever and the magnetic field sensor 24 is coupled to the stationary structure 22, in other embodiments, the magnetic field sensor 24 can be coupled to the gear shift lever 12 and the ferromagnetic target 20 can be coupled to a stationary structure 22.

Figure 1A:
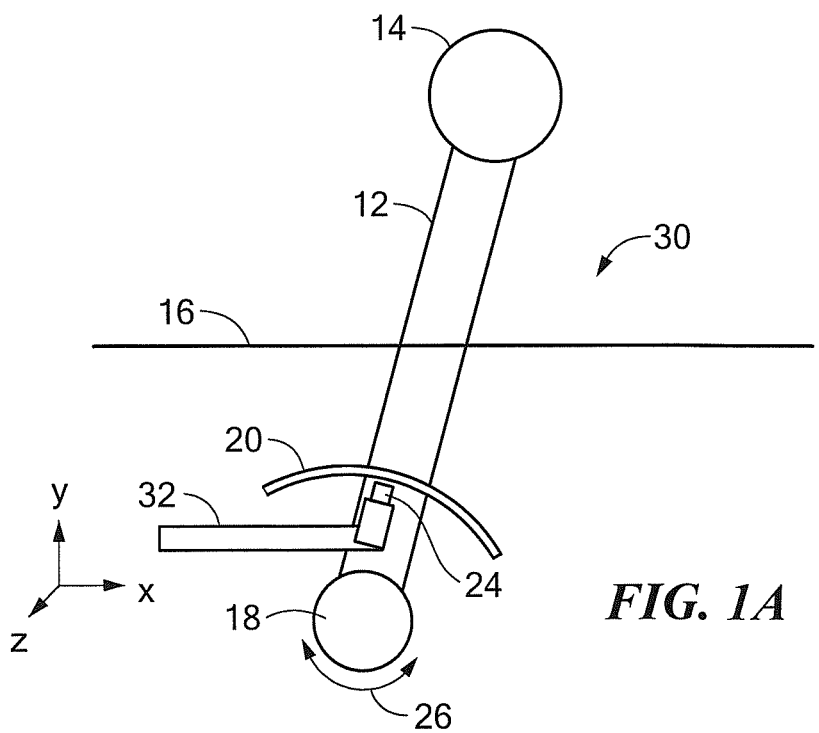
FIG. 1A is a side view of the gearshift lever and the ferromagnetic target of FIG. 1 attached to the gear shift lever, and another magnetic field sensor proximate to the ferromagnetic target.

Referring now to FIG. 1A, in which like elements of FIG. 1 are shown having like reference designations, the magnetic field sensor is shown to be coupled to a different structure 32 on the other side of the ferromagnetic target 20.

Figure 2:
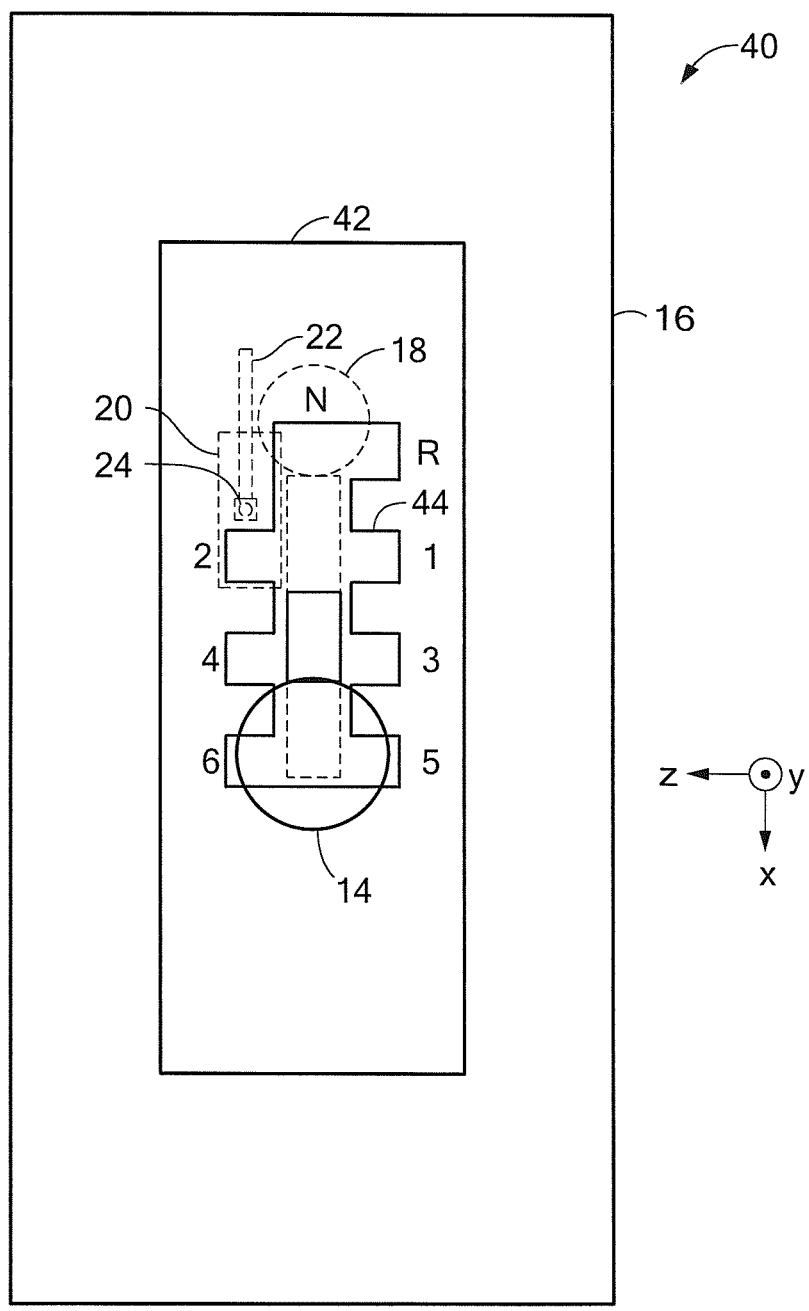
FIG. 2 is a top view of the gearshift lever of FIG. 1A.

Referring now to FIG. 2, in which like elements of FIG. 1 are shown having like reference designations, a gear shift arrangement 40 can be the same as or similar to the gear shift arrangement 10 of FIG. 1, but is here shown from a top view as in an automobile. The automobile can include the automobile console 16, upon which a gear shift plate 42 can be disposed. The gear shift lever 12 extends through an opening 44 in the gear shift plate 42. The opening has features, here identified as R, 1, 2, 3, 4, 5, 6, corresponding to six forward gears of an automobile and one reverse gear. A central opening between the features corresponds to a neutral position, N, of the gear shift lever 12. The features in the gear shift plate 42 can assist a user in moving the gear shift lever 12 to a desired one of the gears, including the neutral position.

As shown, the magnetic field sensor 24 and the ferromagnetic target 20 can be mounted to the side with respect to a position of the gear shift lever 12.

Although a system with eight gears (1, 2, 3, 4, 5, 6, R, N) is shown here, it will be understood that the system could have fewer than eight or more than eight gears. The neutral position is referred to herein as a gear, although the neutral position is sometimes considered to represent an absence of a gear.

Figure 3:
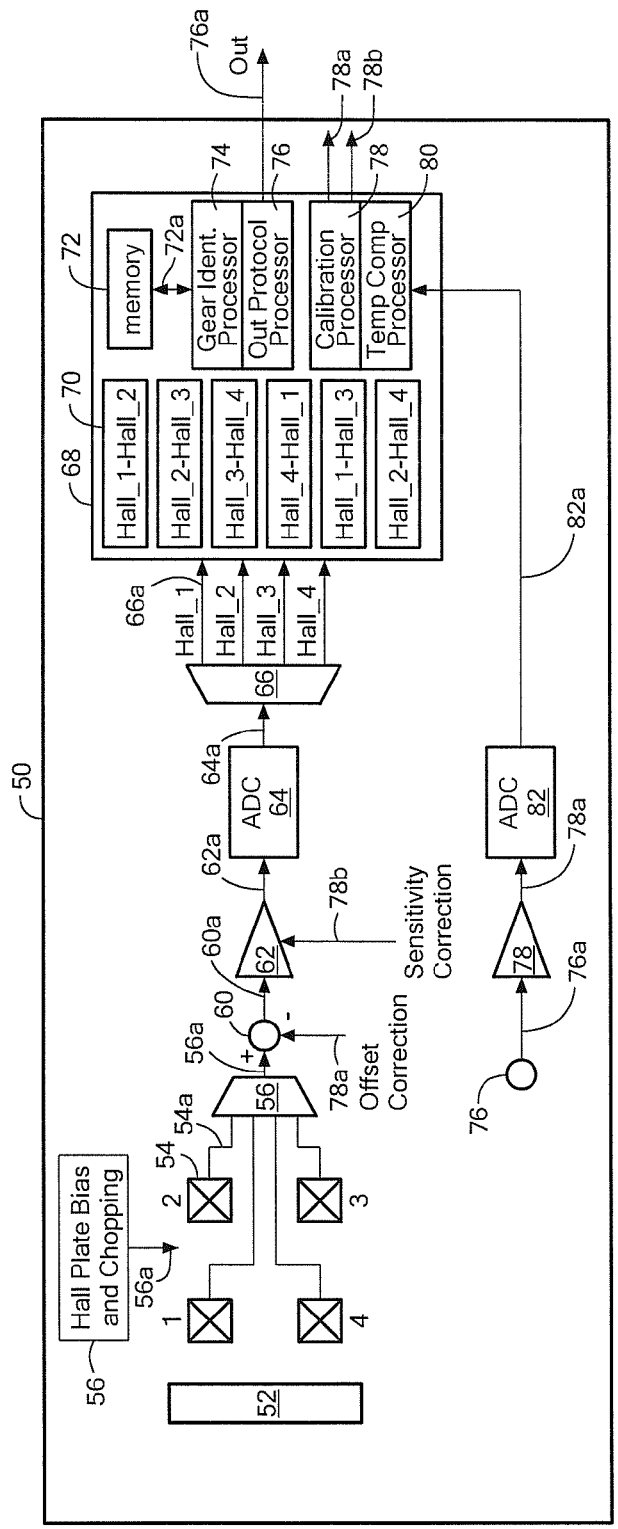
FIG. 3 is a block diagram of an exemplary magnetic field sensor that can be used as the magnetic field sensor of FIGS. 1 and 1A.

Referring now to FIG. 3, a magnetic field sensor 50 can be the same as or similar to the magnetic field sensor 24 of FIGS. 1, 1A, and 2. The magnetic field sensor 50 can include at least two magnetic field sensing elements, here shown to be four planar Hall elements labeled 1, 2, 3, 4. A Hall element 54 is representative of other ones of the Hall elements. A magnet 52 can be disposed within the magnetic field sensor 50 or otherwise can be proximate to the magnetic field sensor 50. The magnet 52 provides a magnetic field to back bias the Hall elements in a so-called "back-biased" arrangement.

The Hall elements, e.g., Hall element 54, are disposed in a plane proximate to the ferromagnetic target 20 of FIGS. 1, 1A, and 2. The magnet 52 is disposed on the other side of the Hall elements and distal from the ferromagnetic target 20. It will be understood that ferromagnetic objects passing near to the Hall elements will tend to alter the magnetic field generated by the magnet and proximate to the Hall elements. This alteration can be sensed by the Hall elements.

The Hall elements generate magnetic field signals. Taking a Hall element 54 as one example of the Hall elements, the Hall element 54 generates a magnetic field signal 54a. The magnetic field sensor 50 can include a multiplexer 56 coupled to receive a plurality of magnetic field signals and configured to generate a multiplexed magnetic field signal 56a having a series sequence of the plurality of magnetic field signals received by the multiplexer 56.

In some embodiments, the magnetic field sensor 50 can include a summing node 60 coupled to receive the multiplexed magnetic field signal 56a, and coupled to receive an offset correction signal 78a. The summing node 60 is configured to generate an offset corrected signal 60a.

The magnetic field sensor 50 can include an amplifier 62 coupled to receive the offset corrected signal 60a, and coupled to receive a sensitivity correction signal 78b. The amplifier 62 is configured to generate a calibrated signal 62a.

The magnetic field sensor 50 can include an analog-to-digital converter (ADC) 64 coupled to receive the calibrated signals 62a and configured to generate a calibrated digital signal 64a.

A digital demultiplexer 66 can be coupled to receive the calibrated digital signal 64a and configured to generate calibrated digital magnetic field signals labeled Hall_1, Hall_2, Hall_3, Hall_4, of which a calibrated digital magnetic field signal 66a is but one example.

The calibrated digital magnetic fields signals can be received by a processing section 68. The processing section 68 can include a plurality of differencing processors, here six differencing processors, of which a differencing processor 70 is but one example. The differencing processors are configured to generate differences (i.e., difference values) between ones of the calibrated digital magnetic field signals received by the processing section 68.

The processing section 68 can include a memory device 72 configured to receive and store a logic table and/or a rules table. Logic tables and rules tables are described more fully below.

The processing section 68 can also include a gear identification processor 74 coupled to receive logic table values and/or rules table values 72a, and coupled to receive the differences generated by the plurality of differencing processors, e.g., 70.

In some embodiments, the logic and/or rules tables are predetermined. In some other embodiments described below in conjunction with FIGS. 17, 17A, 18, and 19, the gear identification processor 74 can adaptively generate the logic table and/or the rules table as the system operates, and can store the logic and/or rules table in the memory device 72.

The gear identification processor 74 is configured to compare the differences generated by the differencing processors with the logic table values and/or the rules table values 72a and to generate a selected gear signal (not shown) indicative of the gear selected by the gear shift lever, e.g., the gear shift lever 12 of FIGS. 1, 1A, and 2.

The selected gear signal can be received by an output protocol processor 76. The output protocol processor 76 is configured to generate an output signal 76a, which is also a selected gear signal, but is in one of a variety of standard output signal formats. The output signal formats of the output signal 76a include, but are not limited to, a SENT format, an I2C format, a pulse width modulated (PWM) format, or a VDA format. Other formats, either parallel or serial, can also be used.

The processing section 68 can also include a calibration processor 78 configured to generate the offset correction signal 78a and the sensitivity correction signal 78b.

The processing section 68 can also include a temperature compensation processor 80 configured to generate a temperature compensation signal (not shown) received by the calibration processor 78.

The magnetic field sensor 50 can also include a temperature sensor 76 configured to generate a temperature signal 76a representative of a temperature of the magnetic field sensor 50. An amplifier 78 can be coupled to receive the temperature signal 76a and configured to generate an amplified temperature signal 78a. An ADC 82 can be coupled to receive the amplified temperature signal 78a and configured to generate a digital temperature signal 82a. The digital temperature signal can also be received by the temperature compensation processor 80.

Specific functions of the calibration processor 78 and of the temperature compensation processor 80 are not described more fully herein, but are generally well known in the art.

While the processing section 68 is shown to include differencing processors, e.g., 70, in other embodiments the calibrated magnetic field signals, e.g., 66a, are used directly without differencing (see, e.g., FIGS. 4 and 4A), in which case the gear identification processor 74 can compare the calibrated magnetic field signals with a logic table stored in the memory device 72 to identify a selected gear.

Figures 4, 4A:
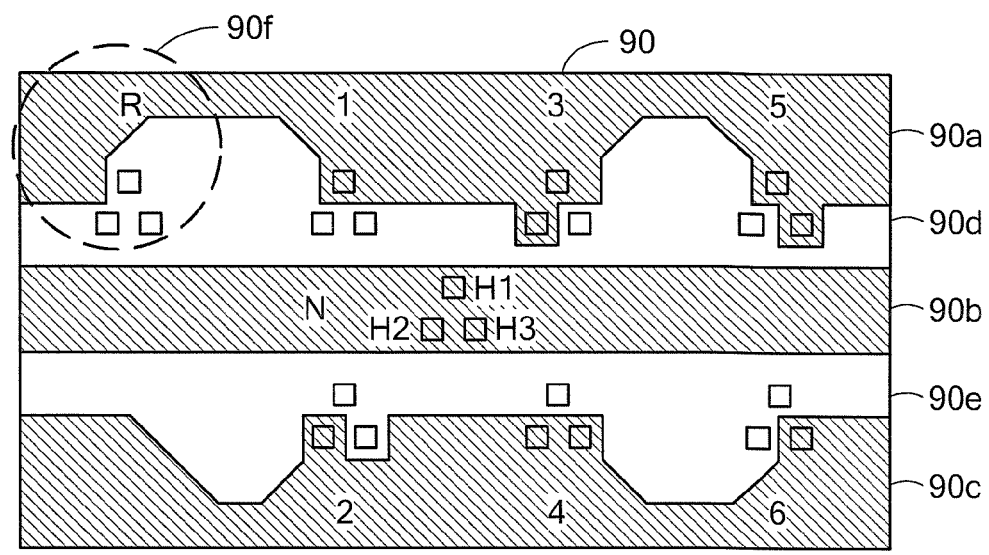
FIG. 4 is a top view of an exemplary ferromagnetic target that can be used as the ferromagnetic target of FIGS. 1 and 1A, and showing positions of three magnetic field sensing elements that can be part of the magnetic field sensor of FIGS. 1 and 1A.
FIG. 4A is an exemplary logic table that can be used in conjunction with the ferromagnetic target of FIG. 4.

While the magnetic field sensor 50 is shown to include four Hall elements, in other embodiments there can be more than four or fewer than four Hall elements (see, e.g., FIGS. 4, 4A). Also, in other embodiments, a different type of magnetic field sensing element can be used.

While the magnetic field sensor 50 is shown to multiplex the four magnetic field signals generated by the four Hall elements into a single channel, in other embodiments, there is no multiplexing.

In some alternate embodiments, the differencing processors are replaced by analog differencing circuits, and the ADC 64 is placed after the analog differencing circuits.

Referring now to FIG. 4, an exemplary ferromagnetic target 90 can be the same as or similar to the ferromagnetic target 20 of FIGS. 1, 1A, 2. The ferromagnetic target 90 has a shape selected such that two or more magnetic field signals generated by a respective two or more magnetic field sensing elements have different respective magnetic field signal values when the gear shift lever selects different ones of a plurality of gears. In particular, the shape of the ferromagnetic target 90 includes top, middle and bottom ferromagnetic plates 90a, 90b, 90c, respectively, separated by two channels 90d, 90e, which are free of ferromagnetic material. In some embodiments, the channels 90d, 90e are open channels free of any material. In other embodiments, the channels 90d, 90e are comprised of a non-ferromagnetic material, for example, aluminum or ceramic.

The two channels 90d, 90e have respective shapes that correspond to two respective sets of gears (i.e., R, 1, 3, 5 and 2, 4, 6) from among the plurality of gears and the center ferromagnetic plate 90b corresponds to an absence of a gear. Neutral and gears are identified by reference designators, N, R, 1, 2, 3, 4, 5, 6.

Three Hall elements upon a magnetic field sensor, for example, upon the magnetic field sensor 50 of FIG. 3, and proximate to the ferromagnetic target 92 are shown in clusters of three boxes at different positions corresponding to different selected gears. When the gear shift lever selects the neutral position, the three Hall elements are at a position at the center of the ferromagnetic target 90. The three Hall elements are labeled at the center position with reference designators H1, H2, H3. The three Hall elements at other positions, or other gears, are not labeled, but the same labeling applies to the three Hall elements at the other positions.

Taking the three Hall elements at a position of gear 1 as an example, it can be seen that the Hall element, H1, is over a ferromagnetic material of the ferromagnetic target 90, and two Hall elements H2, H3, are over an air space, i.e., channel 90d, in the ferromagnetic target 90. Thus, the Hall element, H1, generates a magnetic field signal with a high output, i.e., a one, and the two Hall elements, H2, H3, generate magnetic field signals with low outputs, i.e., zeros. When the three Hall elements are at positions of other ones of the gears it can be seen that other combinations of high and low magnetic field signals are generated. The above example presumes that no difference is calculated between magnetic field signals generated by the three Hall elements.

Although a signal from a Hall element in front of ferromagnetic material is described as generating a high output and a signal from a Hall element in front of an air space is described as generating a low output, it will be understood that the opposite could also be true.

Thus, it will be understood that the selected shape of the ferromagnetic target 90 includes a plurality of features (e.g., 90f) corresponding to shapes of the ferromagnetic plates 90a, 90b, 90c and/or of the channels 90d, 90e. Different ones of the plurality of features correspond to different ones of the plurality of gears. Different ones the plurality of features are disposed at different respective positions on the ferromagnetic target 90 such that the magnetic field sensor, e.g., 24 of FIG. 1, is proximate to different ones of the plurality of features and distal from other ones of the plurality of features when the gear shift lever is moved to different respective positions associated with different respective gears. The plurality of features corresponds to a plurality of wider channel portions of the channels 90d, 90e proximate to a plurality of narrower channel portions. The wider or narrower portions have shapes and positions selected to magnetically interact in different ways with the three Hall elements when the gear shift lever selects different respective gears.

Referring now to FIG. 4A, a logic table having logic table values can be stored in the memory device, for example, the memory device 72 of FIG. 3. The logic table includes a horizontal heading representative of the gears (including neutral) that can be selected by the gear shift lever of FIGS. 1, 1A, and 2, and a vertical heading representative of the three Hall elements of FIG. 4. Zeros and ones in the logic table correspond to high and low outputs of the three Hall elements at different ones of the positions of the gears (including neutral). The gear identification processor 74 of FIG. 3 can evaluate the magnetic field signals generated by the three Hall elements of FIG. 4 and compare them with a logic table stored in the memory device 72, to identify which one of the gears (including neutral) the gear shift lever has selected.

Figures 5, 5A, 5B:
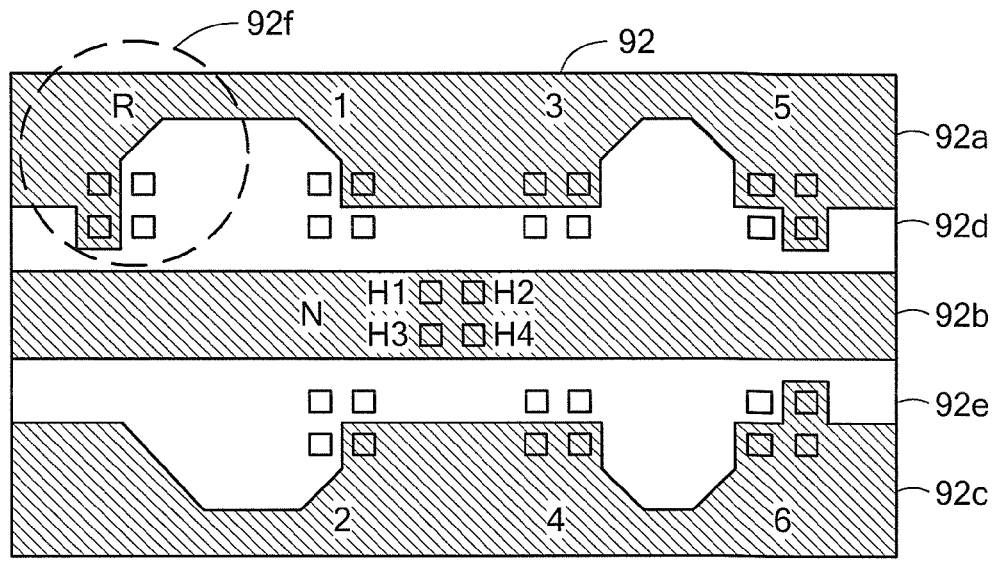
FIG. 5 is a top view of another exemplary ferromagnetic target that can be used as the ferromagnetic target of FIGS. 1 and 1A, and showing positions of four magnetic field sensing elements that can be part of the magnetic field sensor of FIGS. 1 and 1A.
FIG. 5A is an exemplary logic table that can be used in conjunction with the ferromagnetic target of FIG. 5.
FIG. 5B is an exemplary rules table that can be used in conjunction with the ferromagnetic target of FIG. 5.

Referring now to FIG. 5, another exemplary ferromagnetic target 92 can be the same as or similar to the ferromagnetic target 20 of FIGS. 1, 1A, 2. The ferromagnetic target 92 has a selected shape different than the shape of the ferromagnetic target 90 of FIG. 4, but still such that two or more magnetic field signals generated by a respective two or more magnetic field sensing elements have different respective magnetic field signal values when the gear shift lever selects different ones of a plurality of gears. The ferromagnetic target 92 includes top, middle and bottom ferromagnetic plates 92a, 92b, 92c, respectively, separated by two channels 92d, 92e, which are free of ferromagnetic material.

Four Hall elements upon a magnetic field sensor, for example, upon the magnetic field sensor 50 of FIG. 3, and proximate to the ferromagnetic target 92 are shown in clusters of four boxes at different positions corresponding to different selected gears. When the gear shift lever selects the neutral position, the four Hall elements are at a position at the center of the ferromagnetic target 92 proximate to the ferromagnetic plate 92b. The four Hall elements are labeled at the center position with reference designators H1, H2, H3, H4, each generating a respective magnetic field sensing element signal, referred to herein as D1, D2, D3, D4, respectively. The four Hall elements at other positions, or other gears, are not labeled, but the same labeling applies to the four Hall elements at the other positions.

It will be understood that the selected shape of the ferromagnetic target 92 includes a plurality of features (e.g., 92f) corresponding to shapes of the ferromagnetic plates 92a, 92b, 92c and/or of the channels 92d, 92e.

Referring now to FIG. 5A, a logic table can be used when taking each one of the four Hall elements individually without differencing. When a Hall element is over the ferromagnetic material of the ferromagnetic target 92, then it has a high output, or a one. When a Hall element is over one of two channels 92d, 92e, then the Hall element has a low output, or a zero. Different combinations of ones and zeros correspond to different gears (including neutral) as shown.

Referring now to FIG. 5B, a rules table can be used (in addition to or instead of the logic table of FIG. 5A) when taking differences of signals from the four Hall elements of FIG. 5 in so-called "difference pairs." Difference pairs can be generated by the differencing processors of FIG. 3. Difference pairs are denoted Dxy, where x is a first indicated one of the Hall elements and y is a second indicated one of the Hall elements forming a difference between signals of Dx−Dy. When the first indicated one of the Hall elements of a difference pair, i.e., x, is over the ferromagnetic material of the ferromagnetic target 92 and the second indicated one of the Hall elements of the difference pair, i.e., y, is over one of the channels 92d, 92e, then an output signal value of the difference pair is greater than zero. The greater than zero output signal value can also be achieved when the first indicated one the Hall elements of the difference pair is closer to one of the ferromagnetic regions 92a, 92b, 92c than the second indicated one of the Hall elements of the difference pair, even when both Hall elements of the difference pair are over one of the channels 92d, 92e. Conversely, when the second indicated one Hall elements of a difference pair, i.e., y, is over the ferromagnetic material of the ferromagnetic target 92 and the first indicated one of the Hall elements of the difference pair, i.e., x, is over one of the channels 92d, 92e, then an output signal value of the difference pair is less than zero. The less than zero output signal value can also be achieved when the second indicated one the Hall elements of the difference pair is closer to one of the ferromagnetic regions 92a, 92b, 92c than the first indicated one of the Hall elements of the difference pair. When the first and second Hall elements of the difference pair are both over one of the ferromagnetic regions 92a, 92b, 92c, or the same distance from one of the ferromagnetic regions 92a, 92b, 92c, the output signal value of a difference pair is equal to zero.

It will be appreciated that the truth table, like the logic table of FIG. 5A, can be used to identify which one of the gears (including neutral) is selected by the gear shift lever.

Figures 6, 6A:
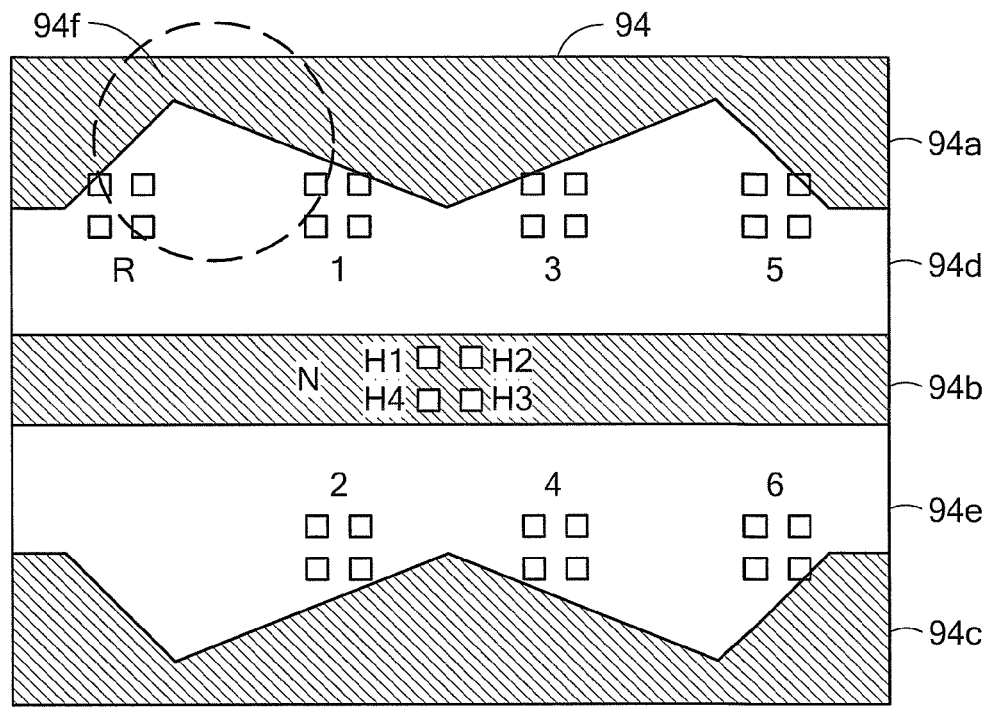
FIG. 6 is a top view of another exemplary ferromagnetic target that can be used as the ferromagnetic target of FIGS. 1 and 1A, and showing positions of four magnetic field sensing elements that can be part of the magnetic field sensor of FIGS. 1 and 1A.
FIG. 6A is an exemplary rules table that can be used in conjunction with the ferromagnetic target of FIG. 6.

Referring now to FIG. 6, another exemplary ferromagnetic target 94 can be the same as or similar to the ferromagnetic target 20 of FIGS. 1, 1A, 2. The ferromagnetic target 94 has a selected shape different than the shape of the ferromagnetic targets 90, 92 of FIGS. 4 and 5, but still such that two or more magnetic field signals generated by a respective two or more magnetic field sensing elements have different respective magnetic field signal values when the gear shift lever selects different ones of a plurality of gears. The ferromagnetic target 94 includes top, middle and bottom ferromagnetic plates 94a, 94b, 94c, respectively, separated by two channels 94d, 94e, which are free of ferromagnetic material.

Four Hall elements upon a magnetic field sensor, for example, upon the magnetic field sensor 50 of FIG. 3, and proximate to the ferromagnetic target 94 are shown in clusters of four boxes at different positions corresponding to different selected gears. When the gear shift lever selects the neutral position, the four Hall elements are at a position at the center of the ferromagnetic target 94 proximate to a plate 94b. The four Hall elements are labeled at the center position with reference designators H1, H2, H3, H4, each generating a respective magnetic field sensing element signal, referred to herein as D1, D2, D3, D4, respectively. The four Hall elements at other positions, or other gears, are not labeled, but the same labeling applies to the four Hall elements at the other positions.

It will be understood that the selected shape of the ferromagnetic target 94 includes a plurality of features (e.g., 94f) corresponding to shapes of the ferromagnetic plates 94a, 94b, 94c and/or of the channels 94d, 94e.

Referring now to FIG. 6A, a rules table can be used when taking differences of signals from the four Hall elements of FIG. 6. Difference pairs are denoted Dx–Dy, where x is a first indicated one of the Hall elements and y is a second indicated one of the Hall elements. As with the difference pairs of FIG. 5, when the first indicated one of the Hall elements of a difference pair, i.e., x, is over the ferromagnetic material of the ferromagnetic target 94 and the second indicated one of the Hall elements of the difference pair, i.e., y, is over one of the channels 94d, 94e, then an output signal value of the difference pair is greater than zero. The greater than zero output signal value can also be achieved when the first indicated one the Hall elements of the difference pair is closer to one of the ferromagnetic regions 94a, 94b, 94c than the second indicated one of the Hall elements of the difference pair. Conversely, when the second indicated one Hall elements of a difference pair, i.e., y, is over the ferromagnetic material of the ferromagnetic target 94 and the first indicated one of the Hall elements of the difference pair, i.e., x, is over one of the channels 94d, 94e, then an output signal value of the difference pair is less than zero. The less than zero output signal value can also be achieved when the second indicated one the Hall elements of the difference pair is closer to one of the ferromagnetic regions 94a, 94b, 94c than the first indicated one of the Hall elements of the difference pair. When the first and second Hall elements of the difference pair are both over one of the ferromagnetic regions 94a, 94b, 94c, or the same distance from one of the ferromagnetic regions 94a, 94b, 94c, the output signal value of a difference pair is equal to zero.

A row in the rules table identified as "opp" is representative of an optional rule that could be used to identify the neutral position of the gear shift lever.

This rules table and rules tables described below also show a gear number 7, which is not indicated in the associated ferromagnetic target 90 of FIG. 6. Gear number 7 is merely included to indicate that there could be a seventh gear opposite from the reverse gear, R.

Figure 7:
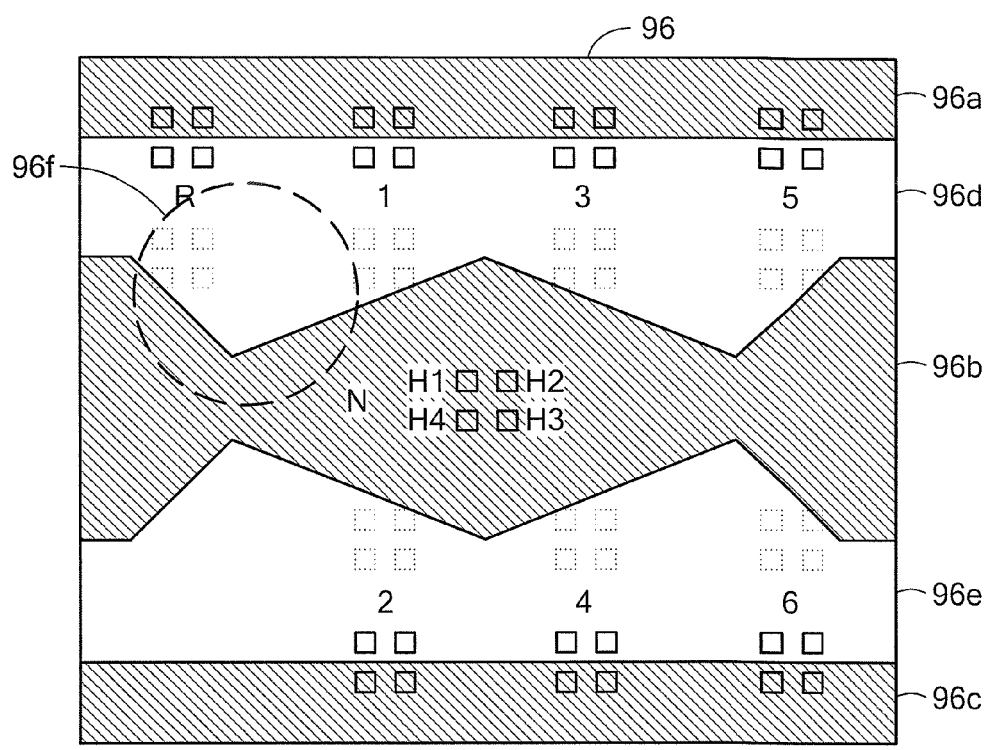
FIG. 7 is a top view of another exemplary ferromagnetic target that can be used as the ferromagnetic target of FIGS. 1 and 1A, and showing positions of four magnetic field sensing elements that can be part of the magnetic field sensor of FIGS. 1 and 1A.

Referring now to FIG. 7, another exemplary ferromagnetic target 96 can be the same as or similar to the ferromagnetic target 20 of FIGS. 1, 1A, 2. The ferromagnetic target 96 has a selected shape different than the shape of the ferromagnetic targets 90, 92, 94 of FIGS. 4, 5, and 6, but still such that two or more magnetic field signals generated by a respective two or more magnetic field sensing elements have different respective magnetic field signal values when the gear shift lever selects different ones of a plurality of gears. The ferromagnetic target 96 includes top, middle and bottom ferromagnetic plates 96a, 96b, 96c, respectively, separated by two channels 96d, 96e, which are free of ferromagnetic material.

Four Hall elements upon a magnetic field sensor, for example, upon the magnetic field sensor 50 of FIG. 3, and proximate to the ferromagnetic target 96 are shown in clusters of four boxes at different positions corresponding to different selected gears. Unlike figures above, the four Hall elements are also shown in clusters of four phantom boxes, shown at intermediate positions, essentially positions that follow the neutral position as a new gear is selected, thereafter resulting in the four boxes at one of the gear positions.

When the gear shift lever selects the neutral position, the four Hall elements are at a position at the center of the ferromagnetic target 96 proximate to the ferromagnetic plate 96b. The four Hall elements are labeled at the center position with reference designators H1, H2, H3, H4, each generating a respective magnetic field sensing element signal, referred to herein as D1, D2, D3, D4, respectively. The four Hall elements at other positions, or other gears, are not labeled, but the same labeling applies to the four Hall elements at the other positions.

The intermediate positions shown in phantom can be used to anticipate a next gear after neutral, so that a gear identification processor (e.g., 74 of FIG. 3) that uses the information about the next gear can adjust transmission characteristics and/or engine characteristics before the gear is achieved. Such anticipated adjustment can achieve better vehicle performance and/or better vehicle gas mileage.

Plates 96a, 96c of the ferromagnetic target 96 have essentially straight edges, such that the channels 96d, 96e each have one straight boundary. Each channel 96d, 96 also has a boundary with angular features (e.g., 96f). It will be understood that the four Hall elements, at each one of the final gear positions R, 1, 3, and 5, each generate the same difference signal values. Similarly, the four Hall elements, and each one of the final gear positions 2, 4, and 6, each generate the same difference signal values. Thus, the magnetic field signals generated by the four Hall elements at each one of the anticipation positions are used to identify the next gear.

It will be understood that the selected shape of the ferromagnetic target 96 includes a plurality of features (e.g., 96f) corresponding to shapes of the ferromagnetic plates 96a, 96b, 96c and/or of the channels 96d, 96e.

Referring now to FIG. 7A, a rules table can be used when taking differences of signals from the four Hall elements of FIG. 7. Difference pairs are denoted Dx–Dy, where x is a first indicated one of the Hall elements and y is a second indicated one of the Hall elements. As with the difference pairs of FIGS. 5A and 6A, when the first indicated one of the Hall elements of a difference pair, i.e., x, is over the ferromagnetic material of the ferromagnetic target 96 and the second indicated one of the Hall elements of the difference pair, i.e., y, is over one of the channels 96d, 96e, then an output signal value of the difference pair is greater than zero. The greater than zero output signal value can also be achieved when the first indicated one the Hall elements of the difference pair is closer to one of the ferromagnetic regions 96a, 96b, 96c than the second indicated one of the Hall elements of the difference pair. Conversely, when the second indicated one Hall elements of a difference pair, i.e., y, is over the ferromagnetic material of the ferromagnetic target 96 and the first indicated one of the Hall elements of the difference pair, i.e., x, is over one of the channels 96d, 96e, then an output signal value of the difference pair is less than zero. The less than zero output signal value can also be achieved when the second indicated one the Hall elements of the difference pair is closer to one of the ferromagnetic regions 96a, 96b, 96c than the first indicated one of the Hall elements of the difference pair. When the first and second Hall elements of the difference pair are over one of the ferromagnetic regions 96a, 96b, 96c, or the same distance from one of the ferromagnetic regions 96a, 96b, 96c, the output signal value of a difference pair is equal to zero.

Because the four Hall elements, at each one of the final gear positions R, 1, 3, and 5, each generate the same difference signal values, and at each one of the final gear positions 2, 4, and 6, each generate the same difference signal values, a system using the ferromagnetic target 96 depends upon the anticipation rules to identify into which gear the gear selection proceeds. The final position rules are used only to identify when the final position of the gear shift lever has been achieved.

Figure 8:
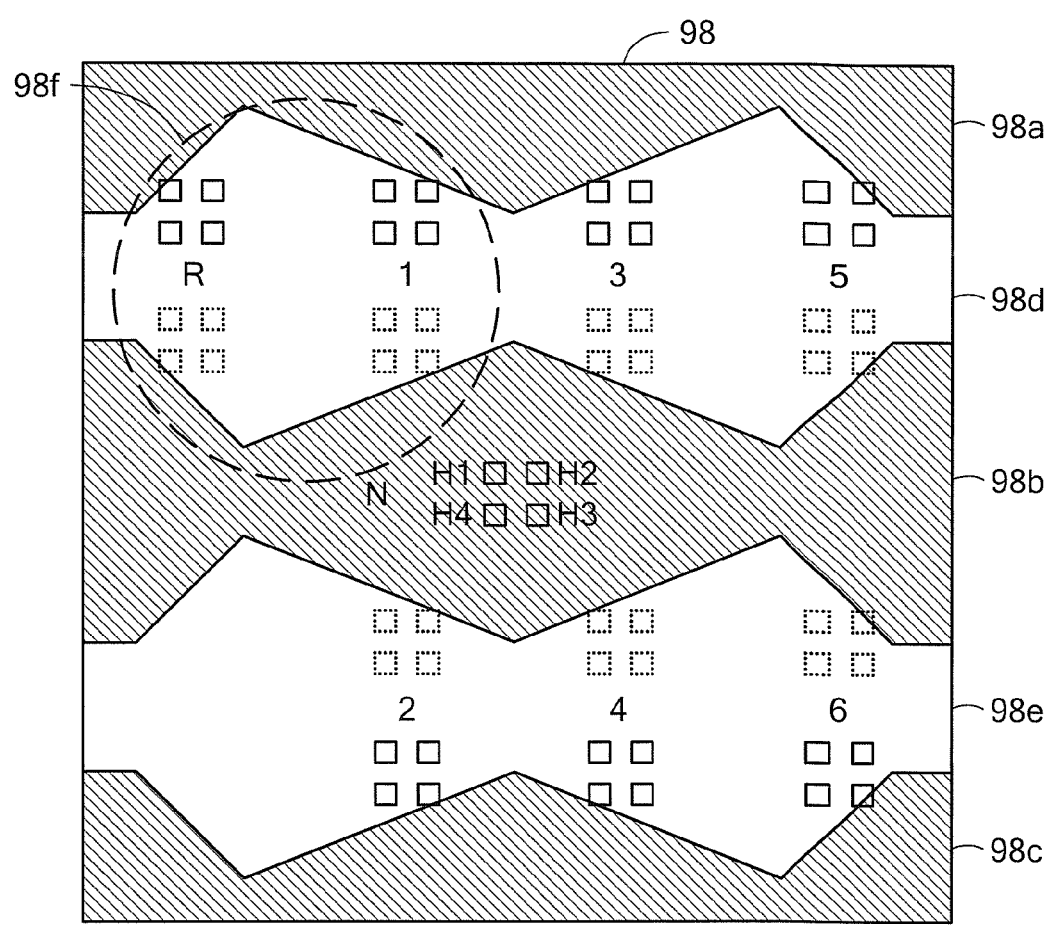
FIG. 8 is a top view of another exemplary ferromagnetic target that can be used as the ferromagnetic target of FIGS. 1 and 1A, and showing positions of four magnetic field sensing elements that can be part of the magnetic field sensor of FIGS. 1 and 1A.

Referring now to FIG. 8, another exemplary ferromagnetic target 98 can be the same as or similar to the ferromagnetic target 20 of FIGS. 1, 1A, 2. The ferromagnetic target 98 has a selected shape different than the shape of the ferromagnetic targets 90, 92, 94, 96 of FIGS. 4, 5, 6, and 7, but still such that two or more magnetic field signals generated by a respective two or more magnetic field sensing elements have different respective magnetic field signal values when the gear shift lever selects different ones of a plurality of gears. The ferromagnetic target 98 includes top, middle and bottom ferromagnetic plates 98a, 98b, 98c, respectively, separated by two channels 98d, 98e, which are free of ferromagnetic material.

Four Hall elements upon a magnetic field sensor, for example, upon the magnetic field sensor 50 of FIG. 3, and proximate to the ferromagnetic target 98 are shown in clusters of four boxes at different positions corresponding to different selected gears. The four Hall elements are also shown in clusters of four phantom boxes, shown at intermediate positions, essentially positions that follow the neutral position as a new gear is selected, thereafter resulting in the four boxes at one of the gear positions.

The intermediate positions shown in phantom can be used to anticipate a next gear after neutral, so that a gear identification processor (e.g., 74, FIG. 3) that uses the information about the next gear can adjust transmission characteristics and/or engine characteristics before the gear is achieved. Such anticipated adjustment can achieve better vehicle performance and/or better vehicle gas mileage.

As with the ferromagnetic targets 90, 92, 94, 96 of FIGS. 4, 5, 6, and 7, when the gear shift lever selects the neutral position, the four Hall elements are at a position at the center of the ferromagnetic target 98 proximate to the ferromagnetic plate 98b. The four Hall elements are labeled at the center position with reference designators H1, H2, H3, H4, each generating a respective magnetic field sensing element signal, referred to herein as D1, D2, D3, D4, respectively. The four Hall elements at other positions, or other gears, are not labeled, but the same labeling applies to the four Hall elements at the other positions.

Unlike the ferromagnetic plates 96a, 96c of FIG. 7, ferromagnetic plates 98a, 98c of the ferromagnetic target 98 do not have straight edges in the channels 98d, 98e, such that the channels 98d, 98e each have two boundaries with angular features. It will be understood that the four Hall elements, at each one of the final gear positions R, 1, 3, and 5, each generate different difference signal values. Similarly, the four Hall elements, and each one of the final gear positions 2, 4, and 6, each generate different difference signal values.

It will be understood that the selected shape of the ferromagnetic target 92 includes a plurality of features (e.g., 98f) corresponding to shapes of the ferromagnetic plates 98a, 98b, 92c and/or of the channels 98d, 98e.

Referring now to FIG. 8A, a rules table can be used when taking differences of signals from the four Hall elements of FIG. 8. Difference pairs are denoted Dx−Dy, where x is a first indicated one of the Hall elements and y is a second indicated one of the Hall elements. As with the difference pairs of FIGS. 5A, 6A, and 7A, when the first indicated one of the Hall elements of a difference pair, i.e., x, is over the ferromagnetic material of the ferromagnetic target 98 and the second indicated one of the Hall elements of the difference pair, i.e., y, is over one of the channels 98d, 98e, then an output signal value of the difference pair is greater than zero. The greater than zero output signal value can also be achieved when the first indicated one the Hall elements of the difference pair is closer to one of the ferromagnetic regions 98a, 98b, 98c than the second indicated one of the Hall elements of the difference pair. Conversely, when the second indicated one Hall elements of a difference pair, i.e., y, is over the ferromagnetic material of the ferromagnetic target 98 and the first indicated one of the Hall elements of the difference pair, i.e., x, is over one of the channels 98d, 98e, then an output signal value of the difference pair is less than zero. The less than zero output signal value can also be achieved when the second indicated one the Hall elements of the difference pair is closer to one of the ferromagnetic regions 98a, 98b, 98c than the first indicated one of the Hall elements of the difference pair. When the first and second Hall elements of the difference pair are both over one of the ferromagnetic regions 98a, 98b, 98c, or the same distance from one of the ferromagnetic regions 98a, 98b, 98c, the output signal value of a difference pair is equal to zero.

A portion of the rules table applies to the positions in phantom that represent an anticipation of a next gear. Another portion of the rules table applies to final positions (i.e., gears including neutral) of the four Hall elements and of the corresponding gears.

Because the four Hall elements, at each one of the final gear positions R, 1, 3, and 5, each generate different difference signal values, and at each one of the final gear positions 2, 4, and 6, each generate the different difference signal values, a system that uses the ferromagnetic target 98 does not depend only upon the anticipation rules to identify into which gear the gear selection proceeds. The final position rules are used essentially for redundancy with the anticipation rules, both able to identify the final position of the gear shift lever.

Figures 9, 9A:
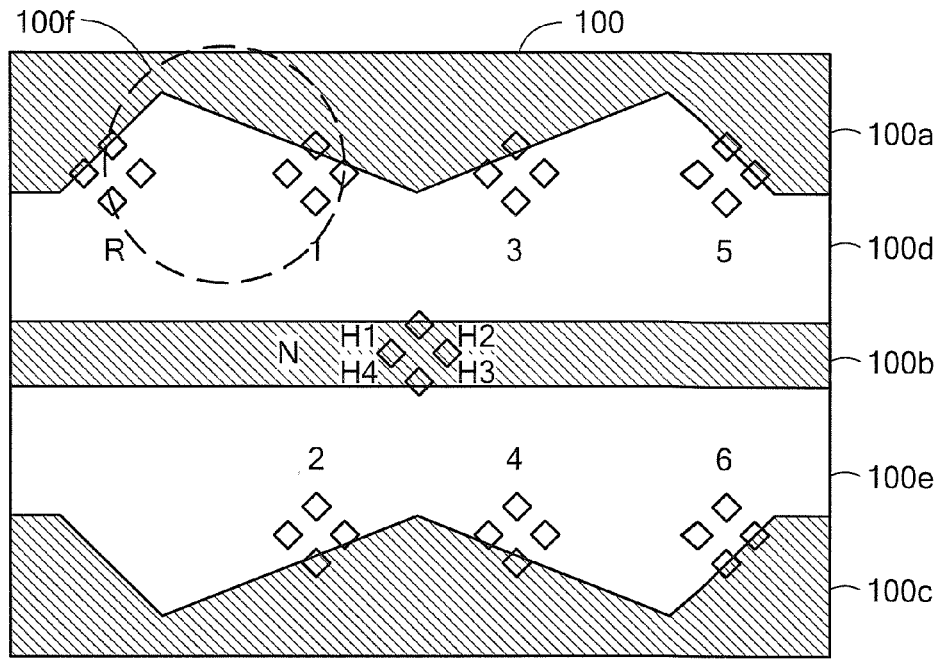
FIG. 9 is a top view of another exemplary ferromagnetic target that can be used as the ferromagnetic target of FIGS. 1 and 1A, and showing positions of four magnetic field sensing elements that can be part of the magnetic field sensor of FIGS. 1 and 1A.
FIG. 9A is an exemplary rules table that can be used in conjunction with the ferromagnetic target of FIG. 9.

Referring now to FIG. 9, another exemplary ferromagnetic target 100 can be the same as or similar to the ferromagnetic target 20 of FIGS. 1, 1A, 2. The ferromagnetic target 100 has a selected shape different than the shape of the ferromagnetic targets 90, 92, 96, 98 of FIGS. 4, 5, 7 and 8, which can be the same as the selected shape of the ferromagnetic target 94 of FIG. 6, and still such that two or more magnetic field signals generated by a respective two or more magnetic field sensing elements have different respective magnetic field signal values when the gear shift lever selects different ones of a plurality of gears. The ferromagnetic target 100 includes top, middle and bottom ferromagnetic plates 100a, 100b, 100c, respectively, separated by two channels 100d, 100e, which are free of ferromagnetic material.

Four Hall elements upon a magnetic field sensor, for example, upon the magnetic field sensor 50 of FIG. 3, are shown in clusters of four boxes at different positions corresponding to different selected gears. Unlike the clusters of four Hall elements shown in figures above, the clusters of four Hall elements are rotated by forty-five degrees.

It will be understood that, in other embodiments, the rotation angle can be larger than or smaller than forty-five degrees.

As with the ferromagnetic targets 90, 92, 94, 96, 98 of FIGS. 4, 5, 6, 7, and 8, when the gear shift lever selects the neutral position, the four Hall elements are at a position at the center of the ferromagnetic target 100 proximate to the ferromagnetic plate 100b. The four Hall elements are labeled at the center position with reference designators H1, H2, H3, H4, each generating a respective magnetic field sensing element signal, referred to herein as D1, D2, D3, D4, respectively. The four Hall elements at other positions, or other gears, are not labeled, but the same labeling applies to the four Hall elements at the other positions.

It will be understood that the four Hall elements, at each one of the final gear positions R, 1, 3, and 5, each generate different difference signal values. Similarly, the four Hall elements, and each one of the final gear positions 2, 4, and 6, each generate different difference signal values.

It will be understood that the selected shape of the ferromagnetic target 100 includes a plurality of features (e.g., 100f) corresponding to shapes of the ferromagnetic plates 100a, 100b, 100c and/or of the channels 100d, 100e.

Referring now to FIG. 9A, a rules table can be used when taking differences of signals from the four Hall elements of FIG. 9. Difference pairs are denoted Dx−Dy, where x is a first indicated one of the Hall elements and y is a second indicated one of the Hall elements. As with the difference pairs of FIGS. 5A, 6A, 7A, and 8A, when the first indicated one of the Hall elements of a difference pair, i.e., x, is over the ferromagnetic material of the ferromagnetic target 100 and the second indicated one of the Hall elements of the difference pair, i.e., y, is over one of the channels 100d, 100e, then an output signal value of the difference pair is greater than zero. The greater than zero output signal value can also be achieved when the first indicated one the Hall elements of the difference pair is closer to one of the ferromagnetic regions 100a, 100b, 100c than the second indicated one of the Hall elements of the difference pair. Conversely, when the second indicated one Hall elements of a difference pair, i.e., y, is over the ferromagnetic material of the ferromagnetic target 100 and the first indicated one of the Hall elements of the difference pair, i.e., x, is over one of the channels 100d, 100e, then an output signal value of the difference pair is less than zero. The less than zero output signal value can also be achieved when the second indicated one the Hall elements of the difference pair is closer to one of the ferromagnetic regions 100a, 100b, 100c than the first indicated one of the Hall elements of the difference pair. When the first and second Hall elements of the difference pair are over one of the ferromagnetic regions 100a, 100b, 100c, or the same distance from one of the ferromagnetic regions 100a, 100b, 100c, the output signal value of a difference pair is equal to zero.

The rules table applies to final positions (i.e., gears, including neutral) of the four Hall elements and of the corresponding gears.

Figures 10, 10A:
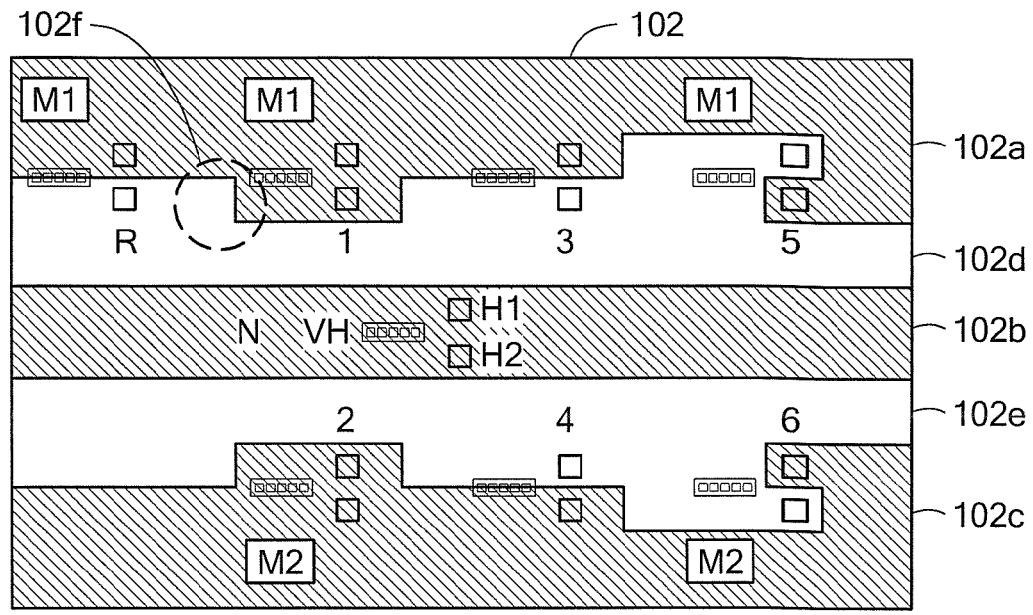
FIG. 10 is a top view of another exemplary ferromagnetic target that can be used as the ferromagnetic target of FIGS. 1 and 1A, and showing positions of three magnetic field sensing elements that can be part of the magnetic field sensor of FIGS. 1 and 1A.
FIG. 10A is an exemplary rules table that can be used in conjunction with the ferromagnetic target of FIG. 10.

Referring now to FIG. 10, another exemplary ferromagnetic target 102 can be the same as or similar to the ferromagnetic target 20 of FIGS. 1, 1A, 2. The ferromagnetic target 102 has a selected shape different than the shape of the ferromagnetic targets 90, 92, 96, 98, 100 of FIGS. 4, 5, 7, 8, and 9, respectively, but still such that two or more magnetic field signals generated by a respective two or more magnetic field sensing elements have different respective magnetic field signal values when the gear shift lever selects different ones of a plurality of gears. The ferromagnetic target 102 includes top, middle and bottom ferromagnetic plates 102a, 102b, 102c, respectively, separated by two channels 102d, 102e, which are free of ferromagnetic material.

Two planar Hall elements and one vertical Hall element upon a magnetic field sensor, for example, upon the magnetic field sensor 50 of FIG. 3, are shown in clusters of two boxes and one rectangle, respectively, at different positions corresponding to different selected gears.

As with the ferromagnetic targets 90, 92, 94, 96, 98, 100 of FIGS. 4, 5, 6, 7, 8, and 9, when the gear shift lever selects the neutral position, the three Hall elements are at a position at the center of the ferromagnetic target 102 proximate to the ferromagnetic plate 102b. The two planar Hall elements are labeled at the center position with reference designators H1, H2, and the one vertical Hall element is labeled at the center position with a reference designator, VH. The two planar Hall elements and the one vertical Hall element at other positions, or other gears, are not labeled, but the same labeling applies to the two planar Hall elements and the one vertical Hall element at the other positions.

As described above, the ferromagnetic target 102 includes the ferromagnetic plates 102a, 102b, 102c and the channels 102d, 102e. Unlike ferromagnetic targets described above, the ferromagnetic target 102 also includes three features with labels, M1, and two features with labels, M2, projecting outward from the page. The features, M1, M2, can be formed by a variety of processes, including, but not limited to, stamping and/or bending the ferromagnetic target 102.

The vertical Hall element, VH, is responsive to proximity of the features M1, M2.

It will be understood that the two planar Hall elements, at each one of the final gear positions R, 1, 3, and 5, generate different difference signal values. Similarly, the two planar Hall elements, at each one of the final gear positions 2, 4, and 6, generate different difference signal values.

It will be understood that the selected shape of the ferromagnetic target 102 includes a plurality of features (e.g., 102f) corresponding to shapes of the ferromagnetic plates 102a, 102b, 102c and/or of the channels 102d, 102e.

Referring now to FIG. 10A, a "differential" column of a rules table can be used when taking differences of the two planar Hall elements of FIG. 10. As with the difference pairs of FIGS. 5A, 6A, and 7A, 8A, and 9A, when a first one of the Hall elements of a difference pair is over the ferromagnetic material of the ferromagnetic target 102 and a second one of the Hall elements of the difference pair is over one of the channels 102d, 102e, then an output signal value of the difference pair is greater than zero. The greater than zero output signal value can also be achieved when the first one the Hall elements of the difference pair is closer to one of the ferromagnetic regions 102a, 102b, 102c than the second one of the Hall elements of the difference pair. Conversely, when the second one Hall elements of a difference pair is over the ferromagnetic material of the ferromagnetic target 102 and the first one of the Hall elements of the difference pair is over one of the channels 102d, 102e, then an output signal value of the difference pair is less than zero. The less than zero output signal value can also be achieved when the second one the Hall elements of the difference pair is closer to one of the ferromagnetic regions 102a, 102b, 102c than the first one of the Hall elements of the difference pair. When the first and second Hall elements of the difference pair are over one of the ferromagnetic regions 102a, 102b, 102c, or the same distance from one of the ferromagnetic regions 102a, 102b, 102c, the output signal value of a difference pair is equal to zero.

In combination with the difference pairs, a "vertical Hall" column can be used in combination with the "differential" column to identify what condition a signal generated by the vertical Hall element of FIG. 10 corresponds to what gear.

The rules table applies to final positions (i.e., gears including neutral) of the two planar Hall elements and one vertical Hall element and of the corresponding gears.

Figure 11:
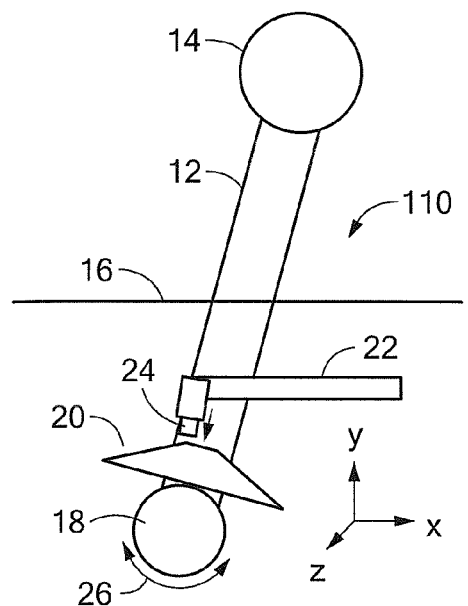
FIG. 11 is a side view of a gearshift lever, a pyramidal ferromagnetic target attached to the gear shift lever, and a magnetic field sensor proximate to the ferromagnetic target.

Referring now to FIG. 11, in which like elements of FIG. 1 are shown having like reference designations, a gear shift arrangement 110 is associated with the gear shift lever 12 as may be used in any type of vehicle, including, but not limited to automobiles, trucks, and boats.

The gear shift lever 12 can be supported by a structure, for example, an automobile console 16.

A ferromagnetic target 112 can be coupled to the gear shift lever 12. The magnetic field sensor 24 can be coupled to the structure 22 that is stationary relative to the gear shift lever 12 as the gear shift lever 12 is moved by a user. The magnetic field sensor 24 is responsive to a position of the ferromagnetic target 112, and therefore, a position of the gear shift lever 12.

The ferromagnetic target 112 has a shape, described more fully below, that allows the magnetic field sensor 24 to identify the position of the gear shift lever 12 in all or nearly all of the positions it can take as the user selects different gears. Here is shown in a side view that the ferromagnetic target, in one aspect of the shape, has a pyramidal shape.

The shape and various features of the ferromagnetic target 112 are described more fully below in conjunction with FIG. 11A.

While it is described above that the ferromagnetic target 112 is coupled to the gear shift lever and the magnetic field sensor 24 is coupled to the stationary structure 22, in other embodiments, the magnetic field sensor 24 can be coupled to the gear shift lever 12 and the ferromagnetic target 112 can be coupled to a stationary structure 22.

Figure 11A:
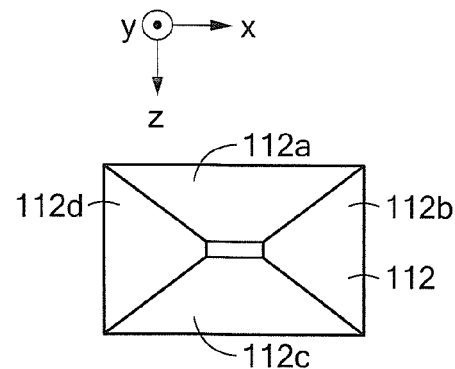
FIG. 11A is a top view of the pyramidal ferromagnetic target that can be used as the ferromagnetic target of FIG. 11.

Referring now to FIG. 11A, a top view of the ferromagnetic target 112 shows that the ferromagnetic target 112 has four sides. However, in other embodiments, a ferromagnetic target can have more than or fewer than four sides.

The magnetic field sensor 50 with four planar Hall elements described above in conjunction with FIG. 3 can be used as the magnetic field sensor 24. Difference signals taken from among four magnetic field signals generated by the four Hall elements can be used to identify in which gear the gear shift level 12 resides. An exemplary rules table associated with the pyramidal ferromagnetic target 112 is not provided herein, but could be deduced by simple experiments. Position of the gear shift lever can be identified by a correlation between the difference signals described above (i.e., differences between Hall element magnetic field signals) and position in the x-y plane.

While the ferromagnetic target 112 is shown to have a flat top, in other embodiments, there is no flat top.

While the four sides of the ferromagnetic target 112 are shown to be symmetrical, and opposite sides have the same slopes, in other embodiments, different sides can have different slopes. In some embodiments, the four sides each have different shapes.

Figure 12:
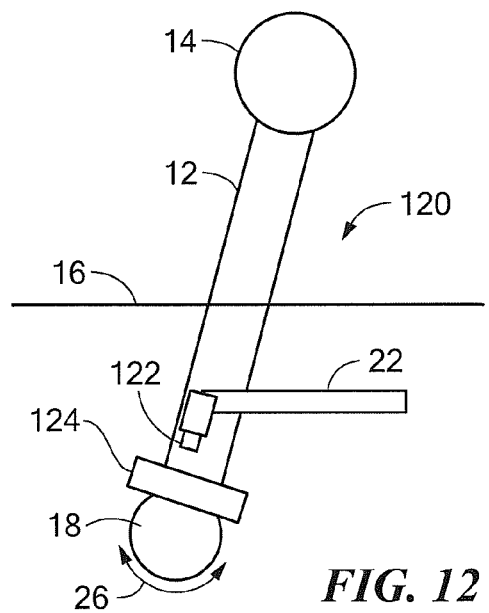
FIG. 12 is a side view of a gearshift lever, a ferromagnetic target in the form of a magnet attached to the gear shift lever, and a magnetic field sensor proximate to the ferromagnetic target.

Referring now to FIG. 12, in which like elements of FIG. 1 are shown having like reference designations, a gear shift arrangement 120 is associated with the gear shift lever 12 as may be used in any type of vehicle, including, but not limited to automobiles, trucks, and boats.

The gear shift lever 12 can be supported by a structure, for example, an automobile console 16.

A target 124, in the form of a permanent magnet 124 described more fully below, can be coupled to the gear shift lever 12. A magnetic field sensor 122 can be coupled to the structure 22 that is stationary relative to the gear shift lever 12 as the gear shift lever 12 is moved by a user. The magnetic field sensor 122 is responsive to a position of the magnet 124, and therefore, a position of the gear shift lever 12.

While, in some embodiments, the magnet 124 can be comprised of a ferromagnetic material, it is separately referred to as a magnet herein as distinguished from the ferromagnetic targets described above. In some embodiments, the magnet 124 is comprised of a rare earth material. In some other embodiments, the magnet 124 is comprised of a ferrite material. In still some other embodiments, the magnet 124 is comprised of a ferromagnetic material.

The magnet 124 has a shape and other characteristics, described more fully below, that allows the magnetic field sensor 122 to identify the position of the gear shift lever 12 in all or nearly all of the positions it can take as the user selects different gears.

The shape and other characteristics of the magnet 124 are described more fully below in conjunction with FIG. 13.

While it is described above that the magnet 124 is coupled to the gear shift lever and the magnetic field sensor 122 is coupled to the stationary structure 22, in other embodiments, the magnetic field sensor 122 can be coupled to the gear shift lever 12 and the magnet 124 can be coupled to a stationary structure 22.

The magnetic field sensor 122 can be one of a variety of types of angle sensor, responsive to a direction of a magnetic field generated by the magnet 124. Embodiments shown below use a circular vertical Hall (CVH) sensing element as an angle sensing element. Other angle sensing elements are known.

Figure 13:
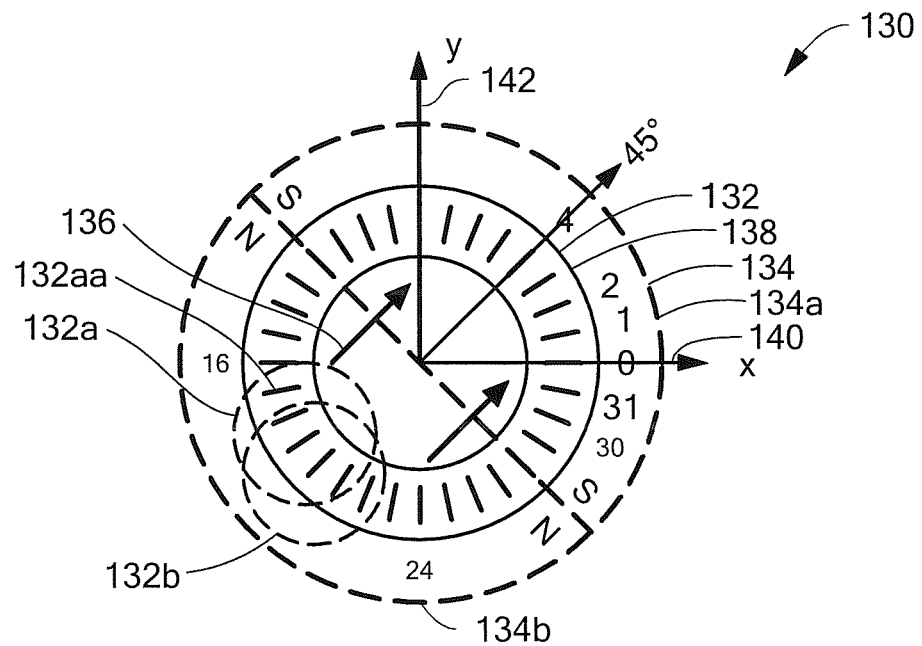
FIG. 13 is a pictorial showing a circular vertical Hall (CVH) sensing element having a plurality of vertical Hall elements arranged in a circle over a common implant region and a two pole magnet disposed close to the CVH sensing element.

Referring now to FIG. 13, a circular vertical Hall (CVH) sensing element 132 can be used as the magnetic field sensing element in the magnetic field sensor 122 of FIG. 12. The CVH sensing element 132 includes a circular implant region 138 having a plurality of vertical Hall elements disposed thereon, of which a vertical Hall element 132a is but one example. Each vertical Hall element has a plurality of Hall element contacts (e.g., four or five contacts), of which a vertical Hall element contact 1322aa is but one example.

A particular vertical Hall element (e.g., 132a) within the CVH sensing element 132, which, for example, can have five adjacent contacts, can share some, for example, four, of the five contacts with a next vertical Hall element (e.g., 132b). Thus, a next vertical Hall element can be shifted by one contact from a prior vertical Hall element. For such shifts by one contact, it will be understood that the number of vertical Hall elements is equal to the number of vertical Hall element contacts, e.g., 32. However, it will also be understood that a next vertical Hall element can be shifted by more than one contact from the prior vertical Hall element, in which case, there are fewer vertical Hall elements than there are vertical Hall element contacts in the CVH sensing element.

A center of a vertical Hall element 0 is positioned along an x-axis 140 and a center of vertical Hall element 8 is positioned along a y-axis 142. In the exemplary CVH 132, there are thirty-two vertical Hall elements and thirty-two vertical Hall element contacts. However, a CVH can have more than or fewer than thirty-two vertical Hall elements and more than or fewer than thirty-two vertical Hall element contacts.

In some applications, a circular magnet 134 having a north side 134a and a south side 134b can be disposed proximate to the CVH 132, and can serve, for example, as the magnet 124 of FIG. 12. The circular magnet 134 tends to generate a magnetic field 136 having a direction from the north side 134a to the south side 134b, here shown to be pointed to a direction of about forty-five degrees relative to x-axis 140. Other magnets having other shapes and configurations are possible.

The CVH sensing element 132, in combination with an electronic circuit described below, can generate a signal related to the angle of rotation of the magnet 134.

Figure 13A:
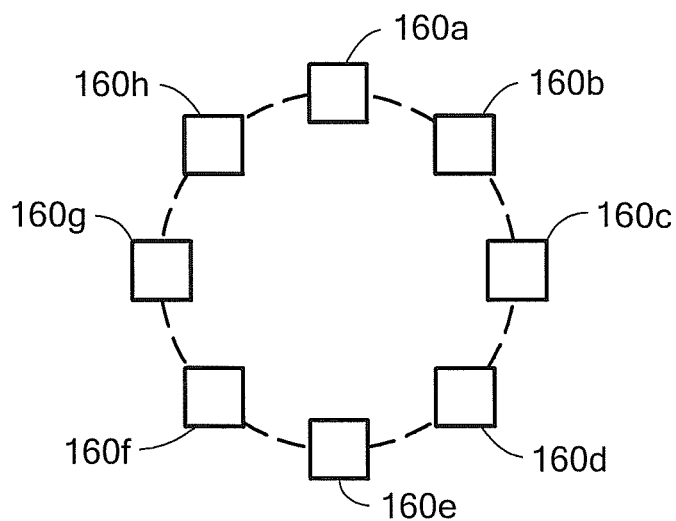
FIG. 13A is a pictorial showing a plurality of magnetic field sensing elements, for example, Hall elements, planar or vertical.

Referring now to FIG. 13A, a plurality of magnetic field sensing elements 160a-160h can be any type of magnetic field sensing elements, for example, planar Hall elements, vertical Hall elements, or magnetoresistance elements. These elements can also be coupled to an electronic circuit similar to that described below. There can also be a magnet (not shown here), the same as or similar to the magnet 134 of FIG. 13, disposed proximate to the magnetic field sensing elements 160a-160h.

Figure 14:
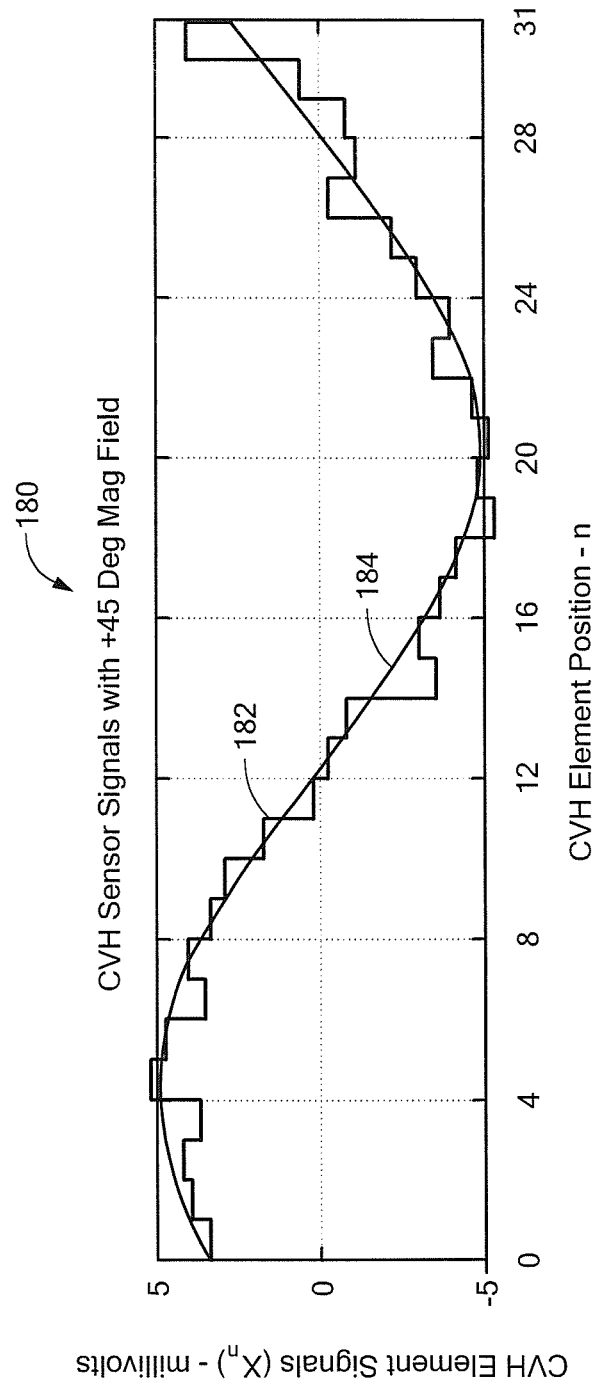
FIG. 14 is a graph showing an output signal as may be generated by the CVH sensing element of FIG. 13 or by the magnetic field sensing elements of FIG. 13A.

Referring now to FIG. 14, a graph 180 has a horizontal axis with a scale in units of CVH vertical Hall element position, n, around a CVH sensing element, for example, the CVH sensing element 132 of FIG. 13. The graph 180 also has a vertical axis with a scale in amplitude in units of millivolts. The vertical axis is representative of output signal levels from the plurality of vertical Hall elements of the CVH sensing element.

The graph 180 includes a signal 182 representative of output signal levels from the plurality of vertical Hall elements of the CVH taken sequentially with the magnetic field of FIG. 13 stationary and pointing in a direction of forty-five degrees.

Referring briefly to FIG. 13, as described above, vertical Hall element 0 is centered along the x-axis 140 and vertical Hall element 8 is centered along the y-axis 142. In the exemplary CVH sensing element 132, there are thirty-two vertical Hall element contacts and a corresponding thirty-two vertical Hall elements, each vertical Hall element having a plurality of vertical Hall element contacts, for example, five contacts.

In FIG. 14, a maximum positive signal is achieved from a vertical Hall element centered at position 4, which is aligned with the magnetic field 136 of FIG. 13, such that a line drawn between the vertical Hall element contacts (e.g., five contacts) of the vertical Hall element at position 4 is perpendicular to the magnetic field. A maximum negative signal is achieved from a vertical Hall element centered at position 20, which is also aligned with the magnetic field 136 of FIG. 13, such that a line drawn between the vertical Hall element contacts (e.g., five contacts) of the vertical Hall element at position 20 is also perpendicular to the magnetic field.

A sine wave 184 is provided to more clearly show the ideal behavior of the signal 182. The signal 182 has variations due to vertical Hall element offsets, which tend to somewhat randomly cause element output signals to be too high or too low relative to the sine wave 184, in accordance with offset errors for each element. The offset signal errors are undesirable. In some embodiments, the offset errors can be reduced by "chopping" each vertical Hall element. Chopping will be understood to be a process by which vertical Hall element contacts of each vertical Hall element are driven in different configurations and signals are received from different ones of the vertical Hall element contacts of each vertical Hall element to generate a plurality of output signals from each vertical Hall element. The plurality of signals can be arithmetically processed (e.g., summed or otherwise averaged) resulting in a signal with less offset.

Full operation of the CVH sensing element 132 of FIG. 13 and generation of the signal 182 of FIG. 14 are described in more detail in the above-described PCT Patent Application No. PCT/EP2008/056517, entitled "Magnetic Field Sensor for Measuring Direction of a Magnetic Field in a Plane," filed May 28, 2008, which is published in the English language as PCT Publication No. WO 2008/145662.

As will be understood from PCT Patent Application No. PCT/EP2008/056517, groups of contacts of each vertical Hall element can be used in a multiplexed or chopped arrangement to generate chopped output signals from each vertical Hall element. Thereafter, or in parallel (i.e., at the same time), a new group of adjacent vertical Hall element contacts can be selected (i.e., a new vertical Hall element), which can be offset by one or more elements from the prior group. The new group can be used in the multiplexed or chopped arrangement to generate another chopped output signal from the next group, and so on.

Each step of the signal 182 can be representative of a chopped output signal from one respective group of vertical Hall element contacts, i.e., from one respective vertical Hall element. However, in other embodiments, no chopping is performed and each step of the signal 182 is representative of an unchopped output signal from one respective group of vertical Hall element contacts, i.e., from one respective vertical Hall element. Thus, the graph 180 is representative of a CVH output signal with or without the above-described grouping and chopping of vertical Hall elements.

It will be understood that, using techniques described above in PCT Patent Application No. PCT/EP2008/056517, a phase of the signal 182 (e.g., a phase of the signal 184) can be found and can be used to identify the pointing direction of the magnetic field 136 of FIG. 13 relative to the CVH sensing element 132.

Figure 15:
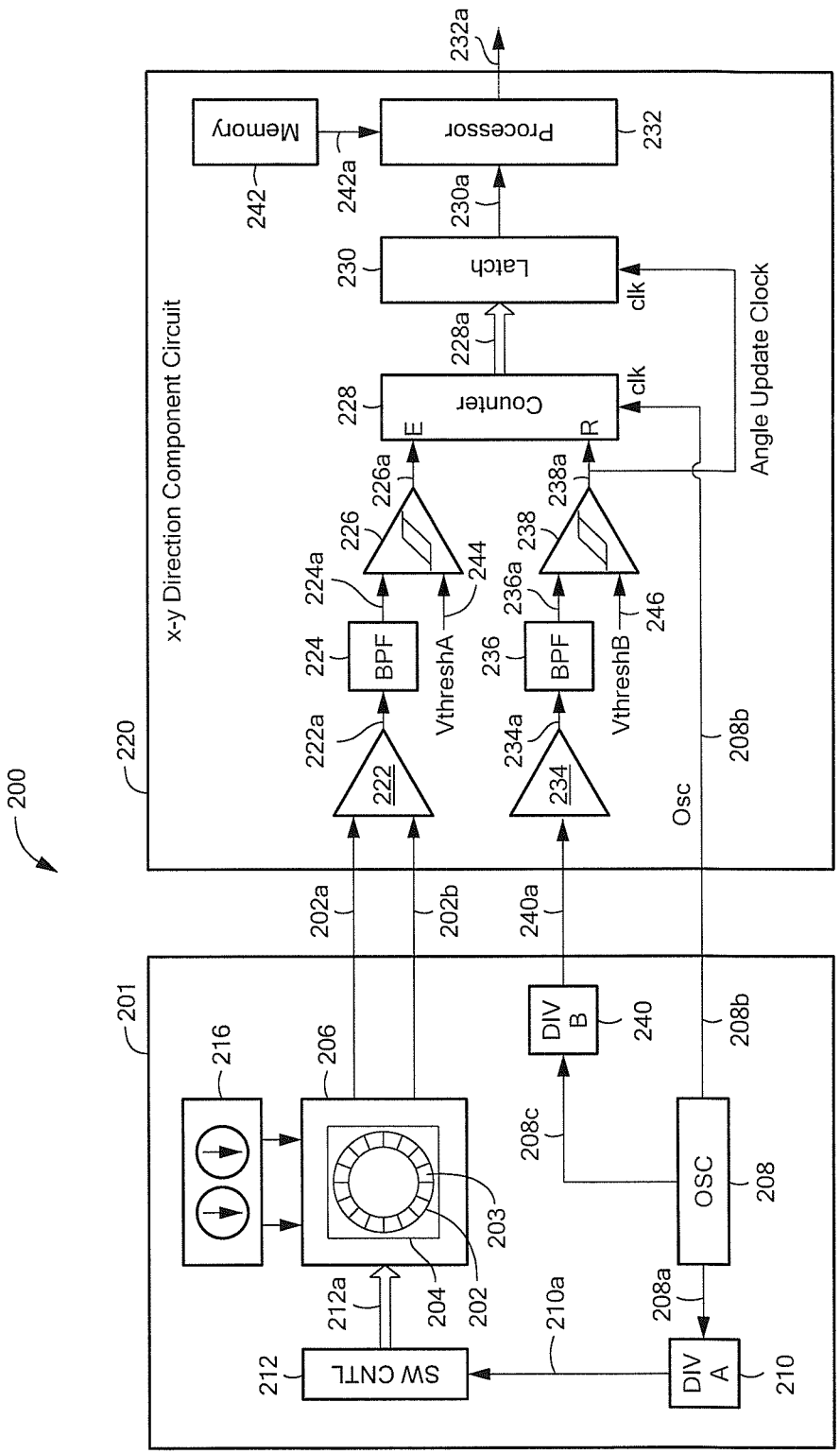
FIG. 15 is a block diagram showing an electronic circuit using a CVH sensing element to determine a direction of a sensed magnetic field.

Referring now to FIG. 15, a magnetic field sensor 200 can be used as the magnetic field sensor 122 of FIG. 12. The magnetic field sensor 200 includes a sensing portion 201. The sensing portion 201 can include a CVH sensing element 202 having a plurality of CVH sensing element contacts, e.g., a CVH sensing element contact 203. In some embodiments there are thirty-two vertical Hall elements in the CVH sensing element 202 and a corresponding thirty-two CVH sensing element contacts. In other embodiments there are sixty-four vertical Hall elements in the CVH sensing element 202 and a corresponding sixty-four CVH sensing element contacts. It will be understood that there can be more than or fewer than thirty-two vertical Hall elements within the CVH sensing element 202. It will also be understood that there can be more than or fewer than sixty-four vertical Hall elements within the CVH sensing element 202.

A magnet (not shown), i.e., the magnet 124 of FIG. 12, can be disposed proximate to the CVH sensing element 202, and can be coupled to the gear shift lever 12. The magnet 124 can be the same as or similar to the magnet 134 of FIG. 13.

As described above, the CVH sensing element 202 can have a plurality of vertical Hall elements, each vertical Hall element comprising a group of vertical Hall element contacts (e.g., five vertical Hall element contacts), of which the vertical Hall element contact 203 is but one example.

In some embodiments, a switching circuit 204 can provide sequential CVH differential output signals 202a, 202b from the CVH sensing element 202.

The CVH differential output signal 202a, 202b is comprised of sequential output signals taken one-at-a-time around the CVH sensing element 202, wherein each output signal is generated on a separate signal path and switched by the switching circuit 204 into the path of the differential output signal 202a, 202b. The signal 182 of FIG. 14 can be representative of the differential signal 202a, 202b. Therefore, the CVH differential output signal 202a, 202b can be represented as a switched set of CVH output signals $x_n = x_0$ to $x_{N-1}$, taken one at a time, where n is equal to a vertical Hall element position (i.e., a position of a group of vertical Hall element contacts that form a vertical Hall element) in the CVH sensing element 202, and where there are N such positions.

In one particular embodiment, the number of vertical Hall elements (each comprising a group of vertical Hall element contacts) in the CVH sensing element 202 is equal to the total number of sensing element positions, N. In other words, the CVH differential output signal 202a, 202b can be comprised of sequential output signals, wherein the CVH differential output signal 202a, 202b is associated with respective ones of the vertical Hall elements in the CVH sensing element 202 as the switching circuit 204 steps around the vertical Hall elements of the CVH sensing element 202 by increments of one, and N equals the number of vertical Hall elements in the CVH sensing element 202. However, in other embodiments, the increments can be greater than one vertical Hall element, in which case N is less than the number of vertical Hall elements in the CVH sensing element 202.

In one particular embodiment, the CVH sensing element 202 has thirty-two vertical Hall elements, i.e., N=32, and each step is a step of one vertical Hall element contact position (i.e., one vertical Hall element position). However, in other embodiments, there can be more than thirty-two or fewer than thirty-two vertical Hall elements in the CVH sensing element 202, for example sixty-four vertical Hall elements. Also, the increments of vertical Hall element positions, n, can be greater than one vertical Hall element contact.

In some embodiments, another switching circuit 206 can provide the above-described "chopping" of groups of the vertical Hall elements within the CVH sensing element 202. Chopping will be understood to be an arrangement in which a group of vertical Hall element contacts, for example, five vertical Hall element contacts that form one vertical Hall element, are driven with current sources 216 in a plurality of different connection configurations, and signals are received from the group of vertical Hall element contacts in corresponding different configurations to generate the CVH differential output signal 202a, 202b. Thus, in accordance with each vertical Hall element position, n, there can be a plurality of sequential output signals during the chopping, and then the group increments to a new group, for example, by an increment of one vertical Hall element contact.

The sensing portion 201 can also include the current sources 216 configured to drive the CVH sensing element 202. However, while current sources 216 are shown, in other embodiments, the current sources 216 can be replaced by voltage sources.

The magnetic field sensor 200 can include an oscillator 208 that provides clock signals 208a, 208b, 208c, which can have the same or different frequencies. A divider 210 is coupled to receive the clock signal 208a and configured to generate a divided clock signal 210a. A switch control circuit 212 is coupled to receive the divided clock signal 210a and configured to generate switch control signals 212a, which are received by the switching circuits 204, 206 to control the sequencing around the CVH sensing element 202, and optionally, to control the chopping of groups of vertical Hall elements within the CVH sensing element 202 in ways described above.

The magnetic field sensor 200 can include a divider 240 coupled to receive the clock signal 208c and configured to generate a divided clock signal 240a.

The magnetic field sensor 200 also includes an x-y direction component circuit 220. The x-y direction component circuit 220 can include an amplifier 222 coupled to receive the CVH differential output signals 202a, 202b. The amplifier 222 is configured to generate an amplified signal 222a. A bandpass filter 224 is coupled to receive the amplified signal 222a and configured to generate a filtered signal 224a. A comparator 226, with or without hysteresis, is configured to receive the filtered signal 224a. The comparator 226 is also coupled to receive a threshold signal 244. The comparator 226 is configured to generate a comparator signal 226a generated by comparison of the filtered signal 224a with the threshold signal 244.

The x-y direction component circuit 220 also includes an amplifier 234 coupled to receive the divided clock signal 240a. The amplifier 234 is configured to generate an amplified signal 234a. A bandpass filter 236 is coupled to receive the amplified signal 234a and configured to generate a filtered signal 236a. A comparator 238, with or without hysteresis, is coupled to receive the filtered signal 236a. The comparator 238 is also coupled to receive a threshold signal 246. The comparator 238 is configured to generate a comparator signal 238a by comparison of the filtered signal 236a with the threshold signal 246.

The bandpass filters 224, 236 can have center frequencies equal to 1/T, where T is the time that it takes to sample all of the vertical Hall elements within the CVH sensing element 202, including chopping when chopping is used.

It should be understood that the amplifier 234, the bandpass filter 236, and the comparator 238 provide a delay of the angle update clock signal 240a in order to match a delay of the circuit channel comprised of the amplifier 222, the bandpass filter 224, and the comparator 226. The matched delays provide phase matching, in particular, during temperature excursions of the magnetic field sensor 200.

A counter 228 can be coupled to receive the comparator signal 226a at an enable input, to receive the divided clock signal 208b at a clock input, and to receive the comparator signal 238a at a reset input.

The counter 228 is configured to generate a phase signal 228a having a count representative of a phase difference between the comparator signal 226a and the comparator signal 238a.

The phase shift signal 228a is received by a latch 230 that is latched upon an edge of the clock signal 238a (or more particularly, an angle update clock signal slightly advanced from the clock signal 238a). The latch 230 is configured to generate a latched signal 230a, also referred to herein as an "x-y angle signal."

It will be apparent that the latched signal 230a is a multi-bit digital signal that has a value representative of a direction of an angle of the magnetic field experience by the CVH sensing element 202, and thus, an angle of the magnet, i.e., the target object 124 of FIG. 12.

In some embodiments, the clock signals 208a, 208b, 208c each have a frequency of about 30 MHz, the divided clock signal 210a has a frequency of about 8 MHz, and the angle update clock signal 240a has a frequency of about 30 kHz. However in other embodiments, the frequencies can be higher or lower than these frequencies With the magnetic field sensor 200, it will be appreciated that an update rate of the x-y angle signal 230a occurs at a rate equivalent to a rate at which all of the vertical Hall elements within the CVH sensing element 202 are collectively sampled (including chopping if chopping is used).

The magnetic field sensor 200 can also include a processor 232 coupled to receive the x-y angle signal 230a and coupled to receive logic table values and/or rules table values from a memory device 242. The processor 232 can include portions of the processing section 68 of FIG. 3, for example, the gear identification processor 74 and the output protocol processor 76 of FIG. 3. In some embodiments, the processor also includes the calibration processor 78 and the temperature compensation processor 80 of FIG. 3. In some embodiments, the magnetic field sensor 200 also includes the temperature sensor 76, the amplifier 78, and the ADC 82 of FIG. 3.

While a CVH sensing element 202 is described above, it will be appreciated that the same techniques apply to a plurality of other magnetic field sensing elements, as described above in conjunction with FIG. 13A.

Referring now to FIG. 16, a rules table values, which can be comprised of angle ranges retained in the memory device 242 of FIG. 15, can be compared with the x-y angle signal 230a to identify in which gear the gear shift lever 12 of FIG. 12 is positioned. Angles shown as single values in the rules table can be bounded by predetermined and angle ranges that are not indicated, for example, +/−twenty degrees. Anticipation rules are also possible using the angle sensing of the magnetic field sensor.

It is shown that, in the neutral gear, there is no measured angle. In this embodiment, when in the neutral gear, the CVH sensing element may provide a differential output signal (e.g., 202a, 202b of FIG. 3) with a value that is below a predetermined critical threshold value. In this condition, an angle measured by the magnetic field sensor 200 of FIG. 15 cannot be trusted, and no angle is measured. This condition can be detected by the magnetic field sensor 200 and this condition can be indicative of the neutral position. However, in other embodiments, when in the neutral position, the magnetic field sensor 200 can provide an angle output signal that can be used in the rules table.

While a variety of ferromagnetic targets are described above, it will be appreciated that other ferromagnetic targets having other shapes can also be used to identify a gear position of a gear shift lever.

In rules tables described above in conjunction with FIGS. 5B, 6A, 7A, 8A, 9A, 10A, certain rules are shown that are representative of comparing difference values (i.e., differences between magnetic field sensing element signals) with threshold values, wherein all of the threshold values are zero. In other embodiments similar to the embodiments described above, any of the zero threshold values can be changed to nonzero threshold values. Furthermore, any of the threshold values, now shown as zero values, can be either statically defined (i.e., predetermined) or dynamically determined during operation. For values that are dynamically determined, the determining can be referred to herein as "adaptive."

Figure 17:
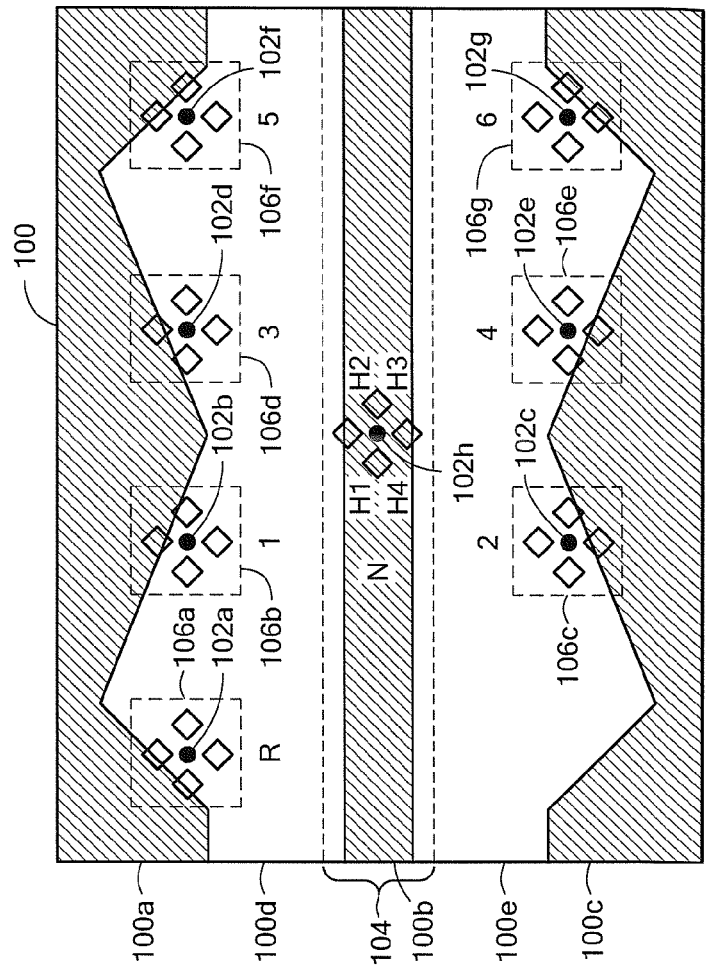
FIG. 17 is a top view again showing the exemplary ferromagnetic target of FIG. 9, and again showing positions of four magnetic field sensing elements that can be part of the magnetic field sensor of FIGS. 1 and 1A.

Referring now to FIG. 17, in which like elements of FIG. 9 are shown having like reference designations, the ferromagnetic target 100 is again shown. Again the four magnetic field sensing elements are shown at positions determined by the gear shift lever selecting forward gears one through six, neutral, and reverse.

While precise positions of the four magnetic field sensing elements are shown for each selected gear, in practice, there are tolerances associated with each selected position. To represent the tolerances, each position of the four magnetic field sensing elements is shown to have an ideal center position 102a-102h. In practice, the center positions 102a-102g can be anywhere within tolerance boxes 106a-106g when the respective gears are selected. Also in practice, the center position 102h, when neutral is selected, can be anywhere within a tolerance region 104. All regions (i.e., regions related to the ferromagnetic target 100) that are not within the boxes 102a-102g and not within the tolerance region 104 are referred to herein as transition regions.

Another tolerance involves a distance (which can change with time or which can be different from unit to unit) between the four magnetic field sensing elements and the ferromagnetic target 100 in a direction out of the page, i.e., an air gap. It will be understood that magnitudes of signals generated by the four magnetic field sensing elements are greatly influenced by the size of the air gap.

In some embodiments, the four magnetic field sensing elements are separated by about 1.2 mm, the tolerance boxes 102a-102g are about +/−1.5 mm (i.e., about three mm in size), the tolerance region 104 extends about 0.5 mm beyond the neutral bar 100b, and the air gap varies between about one millimeter and about two millimeters. However, it should be recognized that, particularly in other applications, for example, a truck transmission versus an automobile transmission, it may be desirable to use different values larger or smaller than the values shown above.

It will be appreciated that, if the gear shift lever moves to a position such that the four magnetic field sensing element are within the transition region, it is highly desirable, perhaps mandatory, that the system does not indicate that the transmission has been shifted into a gear and does not indicate that the gear shift lever has selected neutral. Such is true throughout a range of air gaps. Instead, in this condition, the gear shift lever is moving in transition between gears.

In order to provide a robust system for which the system does not indicate that the transmission has been shifted into a gear or neutral when the four magnetic field sensing elements (or a center therebetween) are in the transition region, throughout the range of air gaps, it may be necessary to use different rules than those shown above in conjunction with FIG. 9A. Alternate exemplary rules are shown below in FIG. 17A.

Referring now to FIG. 17A, a rules table is similar to the rules table of FIG. 9A, however, the threshold values of zero in the rules table of FIG. 9A are replaced with other threshold values. The other threshold values are labeled A1-A12 for values that follow a greater than symbol, B1-B12 for values that follow a less than symbol, and C1-C2 for values that follow and equality symbol. This nomenclature is arbitrary, but is used below to indicate particular alternative arrangements for the threshold values. Any of the threshold values can be zero, but some of the threshold values can be non-zero.

In some embodiments, all of the threshold values with prefix "A" are the same value, all of the threshold values with prefix "B" are the same value, which can be the same value or a different value than the threshold values with the prefix "A", and both of the threshold values with the prefix "C" are the same value, which can be the same value or a different value than the threshold values with the prefixes "A" or "B."

In some other embodiments, all of the threshold values with prefixes "A," "B," and "C" can be different values. In some other embodiments, some of the threshold values with prefixes "A," "B," and "C" can be the same values or not.

In some embodiments, some of, or all of, the threshold values are static and predetermined.

In some other embodiments, some of, or all of, the threshold values are dynamically (i.e., adaptively) determined during operation of the system. Adaptive generation of the threshold values is described more fully below in conjunction with FIGS. 18 and 19.

Figure 18:
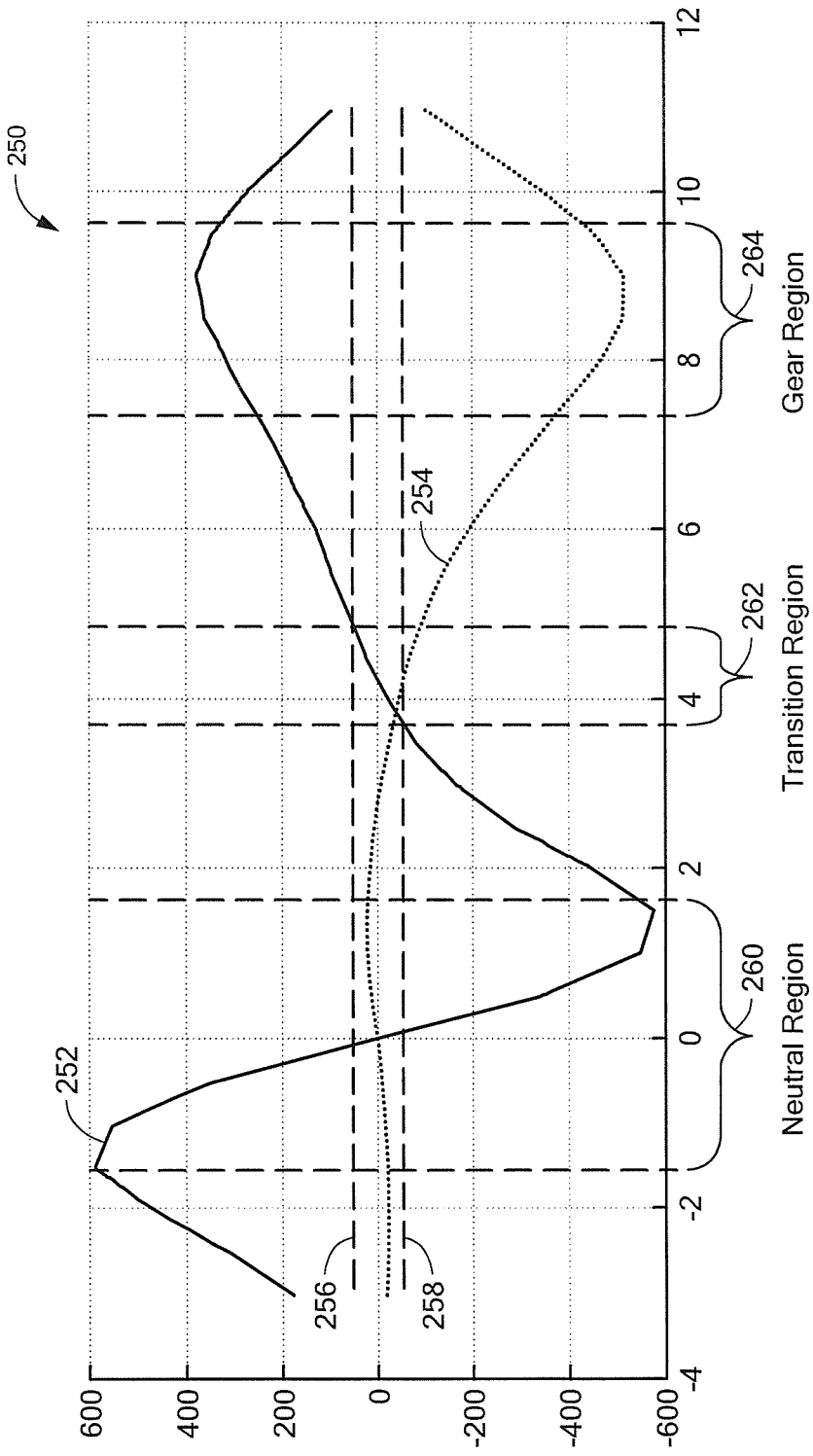
FIG. 18 is a graph showing two curves representative of two differences between output signals from two respective pairs of magnetic field sensing elements as a gear shift lever is shifted between a neutral position and, for example, a reverse gear position and showing two representative thresholds that can be used in conjunction with a gear in the rules table of FIG. 17A, wherein the two thresholds can be dynamically and adaptively generated during operation.

Referring now to FIG. 18, a graph 250 has a vertical axis with a scale in units of Gauss and a horizontal axis with an arbitrary scale representing gear shift lever position.

While reference is made to a reverse gear in examples below, it should be appreciated that the same or similar techniques apply to any gear selected by a gear shift lever.

A curve 252 is representative of a difference of magnetic field signals, namely, D1-D3 (or simply D13), which is s difference between magnetic field signals from magnetic field sensing elements H1 and H3 of FIG. 17. The curve 252 is representative of the difference signal D13 as the gear shift lever is moved from a position "0" indicative of neutral, to a position "8.5" indicative of, for example, a reverse gear.

A curve 254 is representative of a difference of magnetic field signals, namely, D2-D4 (or simply D24), which is s difference between magnetic field signals from magnetic field sensing elements H2 and H4 of FIG. 17. The curve 254 is representative of the difference signal D24 as the gear shift lever is moved from the position "0" indicative of neutral, to the position "8.5" indicative of reverse gear.

The curves 252, 254 are representative of a small air gap, for example a one millimeter air gap between the four magnetic field sensing elements H1-H4 and the ferromagnetic target 100 of FIG. 17.

A threshold value 256 is indicative, for example, of the threshold value A1 of FIG. 17A. A threshold value 256 is representative, for example, of the threshold value B5 of FIG. 17A As the gear shift lever is moved from neutral to the reverse gear, a position of the four magnetic field sensing elements (i.e., a position of a center point of the four magnetic field sensing elements) passes beyond a neutral region 260, through a transition region 262, and to a gear region 264. The neutral tolerance region 104 of FIG. 17 is indicative of the neutral region 260, the gear tolerance region 106a of FIG. 17 is indicative of the gear region 264, and the transition region 262 is between the neutral region 260 and the gear region 264. Here, the transition region is defined as the region where the signals 252 and 254 are close to zero.

Referring briefly to FIG. 17A and, for example, the rule for the reverse gear, it can be seen that the reverse gear rule is met when the four magnetic field sensing elements are in the gear region 264 and nowhere else along the curves 252, 254. However, it can also be seen that, if threshold of zero were used, as indicated in FIG. 9A, then the rule for the reverse gear may also be met at some positions on the horizontal scale greater than about "4" and not within the gear region 264, which is undesirable.

Because the thresholds 256, 258 are not zero, in the above example, the false indication of reverse gear that can otherwise occur for thresholds equal to zero at positions outside of the gear region 264 is eliminated.

Referring briefly to FIG. 2, it will be understood that the gear shift plate 42 tends to restrict positions of the gear shift lever 12, and tends to restrict absolute and relative values that can be achieved by the signals 252, 254.

In some embodiments, the threshold values 256, 258 are adaptively selected in accordance with a respective percentage of the peak magnitude of each difference signal. For example, the threshold value 256 can be computed by the gear identification processor 74 of FIG. 3, as a percentage, for example, twenty percent, of a peak value of the difference signal 252 that occurs at a position of about "9" on the horizontal scale. Similarly, the threshold value 258 can be computed, for example, by the gear identification processor 74 of FIG. 3, as a percentage, for example, fifteen percent, of a peak value of the difference signal 254 that occurs at a position of about "8.7" on the horizontal scale. The percentage can be different percentages as indicated above, or they can be the same percentage.

In some embodiments, the percentages are the same for each gear. In other embodiments, some of, or all of, the gears use different percentages.

In some other embodiments, the threshold values 256, 258 are computed with a digital filter.

The adaptive threshold values described above can make the detection or gear positions more robust, even in the presence of variations in the above-described air gap. To this end, the percentages that are used can change depending upon the peak magnitudes of the difference signals. This technique is described more fully below in conjunction with FIG. 19.

Figure 19:
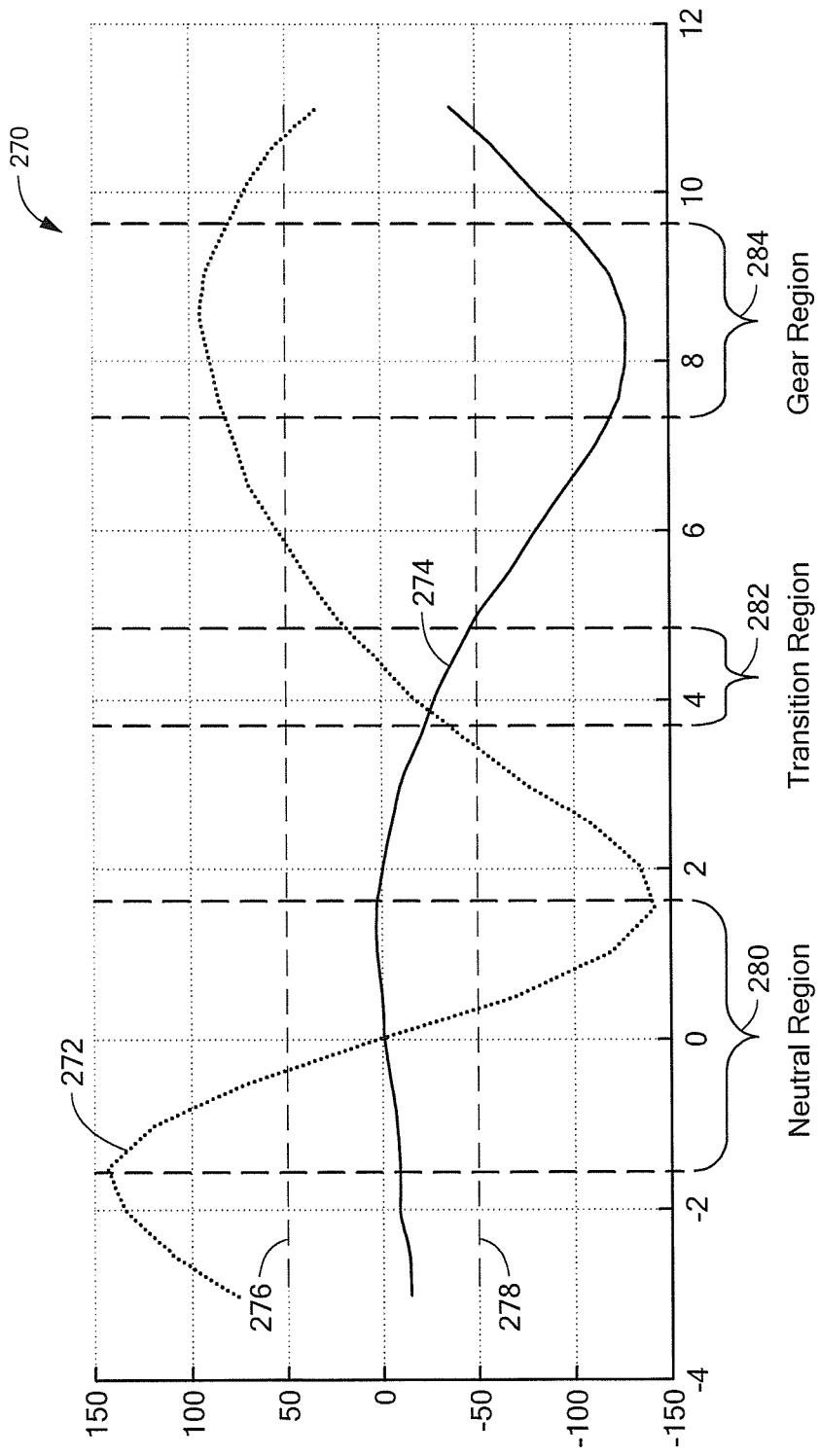
FIG. 19 is a graph showing two curves representative of two differences between output signals from two respective pairs of magnetic field sensing elements as a gear shift lever is shifted between a neutral position and, for example, a reverse gear position and showing two different representative thresholds that can be used in conjunction with the reverse gear in the rules table of FIG. 17A, wherein the two different thresholds can be dynamically and adaptively generated during operation, and wherein the curves are generated for a larger air gap than the curves of FIG. 18.

Referring now to FIG. 19, a graph 270 has a vertical axis with a scale in units of Gauss and a horizontal axis with an arbitrary scale representing gear shift lever position.

A curve 272 is representative of a difference of magnetic field signals, namely, D1-D3 (or simply D13), which is s difference between magnetic field signals from magnetic field sensing elements H1 and H3 of FIG. 17. The curve 272 is representative of the difference signal D13 as the gear shift lever is moved from a position "0" indicative of neutral, to a position "8.5" indicative of, for example, a reverse gear.

A curve 274 is representative of a difference of magnetic field signals, namely, D2-D4 (or simply D24), which is s difference between magnetic field signals from magnetic field sensing elements H2 and H4 of FIG. 17. The curve 274 is representative of the difference signal D24 as the gear shift lever is moved from the position "0" indicative of neutral, to the position "8.5" indicative of the reverse gear.

Unlike the curves 252, 254 of FIG. 18, which are representative of a small air gap, the curves 272, 274 are representative of a large air gap, for example a two millimeter air gap between the four magnetic field sensing elements H1-H4 and the ferromagnetic target 100 of FIG. 17.

A threshold value 276 is indicative, for example, of the threshold value A1 of FIG. 17A. A threshold value 276 is representative, for example, of the threshold value B5 of FIG. 17A, but here for the case of a large air gap.

As the gear shift lever is moved from neutral to the reverse gear, a position of the four magnetic field sensing elements (i.e., a position of a center point of the four magnetic field sensing elements) passes beyond a neutral region 280, through a transition region 282, and to a gear region 284. The neutral tolerance region 104 of FIG. 17 is indicative of the neutral region 280, the gear tolerance region 106a of FIG. 17 is indicative of the gear region 284, and the transition region 282 is between the neutral region 280 and the gear region 284. Here, the transition region is defined as the region where the signals 252 and 254 are close to zero.

Upon detecting the smaller signal peaks of the signals 272, 274 within the gear region 284, the gear identification processor 74 of FIG. 3 can use different percentages than those used above in FIG. 18 for the larger peaks (i.e., for a smaller air gap).

Again, referring briefly to FIG. 2, it will be understood that the gear shift plate 42 tends to restrict positions of the gear shift lever 12, and tends to restrict absolute and relative values that can be achieved by the signals 272, 274.

In some embodiments, the threshold values 276, 278 are adaptively selected in accordance with a respective percentage of the peak magnitude of each difference signal. For example, the threshold value 276 can be computed, for example, by the gear identification processor 74 of FIG. 3, as a percentage, for example, sixty percent, of a peak value of the difference signal 272 that occurs at a position of about "9" on the horizontal scale. Similarly, the threshold value 258 can be computed, for example, by the gear identification processor 74 of FIG. 3, as a percentage, for example, forty percent, of a peak value of the difference signal 274 that occurs at a position of about "8.7" on the horizontal scale. The percentages can be different percentages as indicated above, or they can be the same percentage.

The percentages described above for the larger air gap are larger than the percentages described in conjunction with FIG. 18 for the smaller air gap. In some other embodiments, the same percentages are used regardless of air gap, i.e. for difference signals of all magnitudes. In still some other embodiments, the percentages for the larger air gap are smaller than the percentages described in conjunction with FIG. 18 for the smaller air gap.

While peak values of the difference signals are described above, in other embodiments, peak-to-peak values of the difference signals can be used to generate the threshold values in a similar way. In still other embodiments, maximum slopes of the difference signals can be used.

The various adaptive thresholds can be stored by the gear identification processor 74 of FIG. 3 into the memory device 72, and can be recalled.

Identification of which rule to recall, i.e., which gear is being physically selected, can be made in a number of ways. In some embodiments, the gear identification processor 74 can identify and select a rule by way of a peak magnitude of at least one of the signals, for example, the signals 252, 254 or 272, 274, for example, within gear regions 264, 284, respectively.

Figure 20:
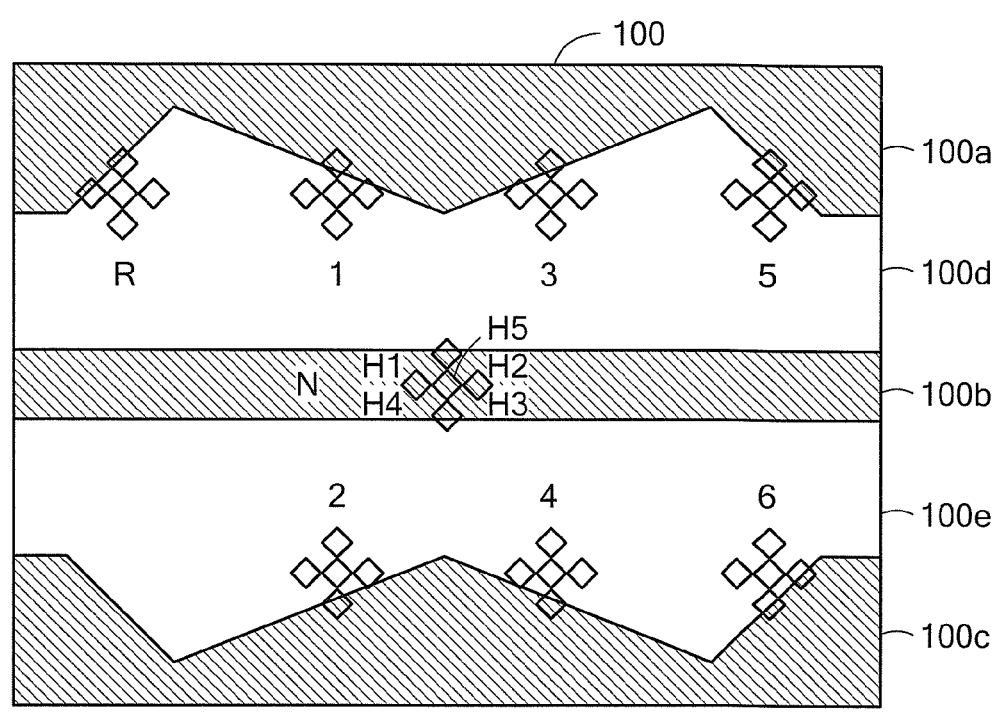
FIG. 20 is a top view of another exemplary ferromagnetic target that can be used as the ferromagnetic target of FIGS. 1 and 1A, and showing positions of five magnetic field sensing elements that can be part of the magnetic field sensor of FIGS. 1 and 1A.

Referring now to FIG. 20, in which like elements of FIGS. 9 and 17 are shown having like reference designations, in some embodiments, there can be five Hall elements as shown. A fifth Hall element H5 can be disposed, for example, at a position in the center of the pattern of Hall elements H1-H4.

In some embodiments, this arrangement can provide difference signals that are referred to a "baseline" signal D5 generated by the Hall element H5 (i.e., a zero reference is not used). For example, where the difference signal D1-D3 is described above, instead, a difference signal (D1-D5) minus a difference signal (D3-D5) (or associated inverses) can be used.

It should be apparent how to modify the magnetic field sensor 50 of FIG. 3 to use five Hall elements.

A rules table is not shown or described in conjunction with FIG. 20. However, it should be apparent that a rules table the same as or similar to those shown above in conjunction with FIGS. 9A and 17A can be used in conjunction with the arraignment of FIG. 20.

All references cited herein are hereby incorporated herein by reference in their entirety. Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A system for identifying a position of a gear shift lever, comprising:
    a magnetic field sensor comprising two or more magnetic field sensing elements, the two or more magnetic field sensing elements configured to generate two or more magnetic field signals in response to a sensed magnetic field influenced by a relative position between the magnetic field sensor and a target, the target comprising a ferromagnetic target, the target disposed proximate to the magnetic field sensor, wherein at least one of the magnetic field sensor or the target is configured to couple to the gear shift lever, the gear shift lever configured to move to select from among a plurality of gears, wherein the other one of the magnetic field sensor or the target is configured to couple to a structure stationary with respect to the gear shift lever, wherein the target comprises:
        selected characteristics such that the two or more magnetic field signals have different respective magnetic field signal values when the gear shift lever selects different ones of the plurality of gears, wherein the magnetic field sensor further comprises:
    an electronic circuit coupled to receive the two or more magnetic field signals, wherein positions of the two or more magnetic field sensing elements within the magnetic field sensor are selected as predetermined positions to result in the electronic circuit being operable to generate an output signal indicative of selected ones of the plurality of gears selected by the gear shift lever; and
    a back-biasing magnet, the two or more magnetic field sensing elements disposed between the back-biasing magnet and the target, the back-biasing magnet for generating the sensed magnetic field.

2. The system of claim 1, and wherein the selected characteristics comprise a selected shape, comprising:
    a plurality of features, different ones of the plurality of features corresponding to different ones of the plurality of gears, wherein different ones of the plurality of features are disposed at different respective positions on the ferromagnetic target such that the magnetic field sensor is proximate to different ones of the plurality of features and distal from other ones of the plurality of features when the gear shift lever is moved to different respective positions associated with different respective gears, wherein the two or more magnetic field signals have different magnetic field signal values when the gear shift lever selects different respective gears.

3. The system of claim 2, wherein the selected shape further comprises a curve of the ferromagnetic target about at least one axis.

4. The system of claim 2, wherein the ferromagnetic target comprises:
    three plates comprised of a ferromagnetic material, and
    two channels free of ferromagnetic material separating the three ferromagnetic plates, wherein the two channels have respective shapes that correspond to two respective sets of gears from among the plurality of gears.

5. The system of claim 4, wherein the two channels comprise:
    a plurality of wider channel portions proximate to a plurality of narrower channel portions, the wider or narrower portions having shapes and positions selected to magnetically interact in different ways with the at least two magnetic field sensing elements when the gear shift lever selects different respective gears.

6. The system of claim 5, wherein the at least two magnetic field sensing elements comprise at least two planar Hall elements.

7. The system of claim 6, wherein the ferromagnetic target further comprises a plurality of projecting features projecting above a major surface of the ferromagnetic target.

8. The system of claim 7, wherein the at least two magnetic field sensing elements further comprise at least one of a vertical Hall element or a magnetoresistance element, wherein the vertical Hall element or the magnetoresistance element are responsive to proximity of ones of the plurality of projecting features.

9. The system of claim 1, wherein the selected characteristics comprise a selected shape, and wherein the selected shape comprises a plurality of projecting features projecting above a major surface of the ferromagnetic target.

10. The system of claim 9, wherein the at least two magnetic field sensing elements comprise at least one of a vertical Hall element or a magnetoresistance element, wherein the vertical Hall element or the magnetoresistance element are responsive to proximity of ones of the plurality of projecting features.

11. The system of claim 1, wherein the selected characteristics comprise a selected shape, and wherein the selected shape comprises a pyramid shape having a plurality of sides.

12. The system of claim 11, wherein the magnetic field sensor has different relative distances to different ones of the plurality of sides when the gear shift lever is moved to positions associated with different respective gears, wherein the two or more magnetic field signals have different respective magnetic field signal values when the gear shift lever selects different gears.

13. The system of claim 1, wherein the electronic circuit comprises:
a memory device configured to store a logic table having different logic values associated with each different one of the plurality of gears; and
a processor, wherein the processor is configured to process the at least two magnetic field signals and to compare values of the at least two magnetic field signals with the logic table to generate the output signal indicative of selected ones of the plurality of gears selected by the gear shift lever.

14. The system of claim 13, wherein the processor is further configured to identify a gear change and to use the logic table to anticipate a next gear before the next gear is achieved.

15. The system of claim 1, Wherein the electronic circuit comprises:
a memory device configured to store a rules table having a different rule or a different set of rules associated with each different one of the plurality of gears; and
a processor, wherein the processor is configured to process differences between values of the at least two magnetic field signals and to compare the differences with the rules table to generate the output signal indicative of selected ones of the plurality of gears selected by the gear shift lever.

16. The system of claim 15, wherein the rules table comprises a plurality of threshold relationships between a respective plurality of threshold values and a respective plurality of the differences.

17. The system of claim 16, wherein each one of the plurality of threshold values is predetermined.

18. The system of claim 16, wherein each one of the plurality of threshold values is adaptively determined during operation of the system.

19. The system of claim 18, wherein the processor is further configured to identify a respective characteristic value of each one of the differences, wherein the processor is further configured to adaptively determine the plurality of threshold values in accordance with characteristic values.

20. The system of claim 19, wherein the characteristic values correspond to respective peak values of the each one of the differences.

21. The system of claim 18, wherein the processor is configured to process selected ones of the differences in accordance with respective selected ones of the gears, wherein the processor is further configured to identify a respective characteristic value of each one of the differences, wherein the processor is further configured to adaptively determine the plurality of threshold values in accordance with characteristic values.

22. The system of claim 21, wherein the characteristic values correspond to respective peak values of the each one of the differences.

23. The system of claim 22, wherein the processor is further configured to identify a gear change and to use the rules table to anticipate a next gear before the next gear is achieved.

24. A system for identifying a position of a gear shift lever, comprising:
a magnetic field sensor comprising two or more magnetic field sensing elements, the two or more magnetic field sensing elements configured to generate two or more magnetic field signals in response to a sensed magnetic field influenced by a relative position between the magnetic field sensor and a target, the target comprising a magnet, the target disposed proximate to the magnetic field sensor, wherein at least one of the magnetic field sensor or the target is configured to couple to the gear shift lever, the gear shift lever configured to move to select from among a plurality of gears, wherein the other one of the magnetic field sensor or the target is configured to couple to a structure stationary with respect to the gear shift lever, wherein the target comprises:
selected characteristics such that the two or more magnetic field signals have different respective magnetic field signal values when the gear shift lever selects different ones of the plurality of gears, wherein the magnetic field sensor further comprises:
an electronic circuit coupled to receive the two or more magnetic field signals and configured to identify an angle of the sensed magnetic field relative to the magnetic field sensor and configured to generate, in accordance with the identified angle, and output signal indicative of selected ones of the plurality of gears selected by the gear shift lever, wherein the two or more magnetic field sensing elements comprise a plurality of vertical Hall elements arranged in a circle or a plurality of magnetoresistance elements arranged in a circle.

25. The system of claim 24, wherein the magnet comprises a permanent magnet.

26. The system of claim 25, wherein the permanent magnet is comprised of a uniform rare earth material or a ferrite material.

27. The system of claim 25, wherein the selected characteristics comprise a selected shape comprising a disk shape and the permanent magnet has a north pole and a south pole.

28. The system of claim 24, wherein the two or more magnetic field sensing elements comprise the plurality of vertical Hall elements arranged in the circle, and wherein the plurality of vertical Hall elements is arranged as a circular vertical Hall (CVH) sensing-element upon a substrate.

29. The system of claim 28, wherein the magnet comprises a permanent magnet.

30. The system of claim 29, wherein the permanent magnet is comprised of a uniform rare earth material or a ferrite material.

31. The system of claim 29, wherein the selected characteristics comprise a selected shape comprising a disk shape and the permanent magnet has a north pole and a south pole.

32. A method of identifying a position of a gear shift lever, comprising:
providing a magnetic field sensor comprising two or more magnetic field sensing elements, the two or more magnetic field sensing elements configured to generate two or more magnetic field signals in response to a sensed magnetic field;

providing a target comprising a ferromagnetic target proximate to the magnetic field sensor, the sensed magnetic field influenced by a relative position between the magnetic field sensor and the target;

coupling at least one of the magnetic field sensor or the target to the gear shift lever, the gear shift lever configured to move to select from among a plurality of gears;

coupling the other one of the magnetic field sensor or the target to a structure stationary with respect to the gear shift lever, wherein the target comprises:

selected characteristics such that the two or more magnetic field signals have different respective magnetic field signal values when the gear shift lever selects different ones of the plurality of gears, wherein the method further comprises:

selecting predetermined positions of the two or more magnetic field sensing elements within the magnetic field sensor;

generating an output signal indicative of selected ones of the plurality of gears selected by the gear shift lever, wherein the providing the magnetic field sensor further comprises providing a back-biasing magnet, the two or more magnetic field sensing elements disposed between the back-biasing magnet and the target, the back-biasing magnet for generating the sensed magnetic field.

33. The method of claim 32, wherein the selected characteristics comprise a selected shape, wherein the selected shape comprises:

a plurality of features, different ones of the plurality of features corresponding to different ones of the plurality of gears, wherein different ones the plurality of features are disposed at different respective positions on the ferromagnetic target such that the magnetic field sensor is proximate to different ones of the plurality of features and distal from other ones of the plurality of features when the gear shift lever is moved to different respective positions associated with different respective gears, wherein the two or more magnetic field signals have different magnetic field signal values when the gear shift lever selects different respective gears.

34. The method of claim 33, wherein the selected shape further comprises a curve of the ferromagnetic target about at least one axis.

35. The method of claim 33, wherein the ferromagnetic target comprises:

three plates comprised of a ferromagnetic material, and two channels free of ferromagnetic material separating the three ferromagnetic plates, wherein the two channels have respective shapes that correspond to two respective sets of gears from among the plurality of gears.

36. The method of claim 35, wherein the two channels comprise:

a plurality of wider channel portions proximate to a plurality of narrower channel portions, the wider or narrower portions having shapes and positions selected to magnetically interact in different ways with the at least two magnetic field sensing elements when the gear shift lever selects different respective gears.

37. The method of claim 35, wherein the at least two magnetic field sensing elements comprise at least two planar Hall elements.

38. A method of identifying a position of a gear shift lever, comprising:

providing a magnetic field sensor comprising two or more magnetic field sensing elements, the two or more magnetic field sensing elements configured to generate two or more magnetic field signals in response to a sensed magnetic field;

providing a target comprising a magnet proximate to the magnetic field sensor, the sensed magnetic field influenced by a relative position between the magnetic field sensor and the target;

coupling at least one of the magnetic field sensor or the target to the gear shift lever, the gear shift lever configured to move to select from among a plurality of gears;

coupling the other one of the magnetic field sensor or the target to a structure stationary with respect to the gear shift lever, wherein the target comprises:

selected characteristics such that the two or more magnetic field signals have different respective magnetic field signal values when the gear shift lever selects different ones of the plurality of gears, wherein the method further comprises:

identifying an angle of the sensed magnetic field relative to the magnetic field sensor; and generating, in accordance with the identified angle, and output signal indicative of selected ones of the plurality of gears selected by the gear shift lever, wherein the two or more magnetic field sensing elements comprise a circular vertical Hall (CVH) sensing element.

39. The method of claim 32, wherein the generating the output signal comprises:

storing a logic table having different logic values associated with each different one of the plurality of gears; and processing, with a processor, the at least two magnetic field signals; and comparing, with the processor, values of the at least two magnetic field signals with the logic table to generate the output signal indicative of selected ones of the plurality of gears selected by the gear shift lever.

40. The method of claim 39, wherein the comparing values further comprises:

using the logic table to anticipate a next gear before the next gear is achieved.

41. The method of claim 32, wherein the generating the output signal comprises:

storing a rules table having a different rule or a different set of rules associated with each different one of the plurality of gears;

processing, with a processor, differences between values of the at least two magnetic field signals; and comparing, with the processor, the differences with the rules table to generate the output signal indicative of selected ones of the plurality of gears selected by the gear shift lever.

42. The method of claim 41, wherein the rules table comprises a plurality of threshold relationships between a respective plurality of threshold values and a respective plurality of the differences.

43. The method of claim 42, wherein each one of the plurality of threshold values is predetermined.

44. The method of claim 42, wherein each one of the plurality of threshold values is adaptively determined during operation of the method.

45. The method of claim 44, wherein the generating the output signal farther comprises:

identifying, with the processor, a respective characteristic value of each one of the differences; and adaptively determining, with the processor, the plurality of threshold values in accordance with characteristic values.

46. The method of claim 45, wherein the characteristic values correspond to respective peak values of the each one of the differences.

47. The method of claim 44, wherein the generating the output signal further comprises:
- processing, with the processor, selected ones of the differences between values of the at least two magnetic field signals in accordance with respective selected ones of the gears;
- identifying, with the processor, a respective characteristic value of each one of the differences associated with each one of the gears; and
- adaptively determining, with the processor, the plurality of threshold values in accordance with characteristic values.

48. The method of claim 47, Wherein the characteristic values correspond to respective peak values of each one of the differences.

* * * * *

UNITED STATES PATENT AND TRADEMARK OFFICE
CERTIFICATE OF CORRECTION

PATENT NO. : 9,046,383 B2
APPLICATION NO. : 13/484316
DATED : June 2, 2015
INVENTOR(S) : Andreas P. Friedrich et al.

Page 1 of 2

It is certified that error appears in the above-identified patent and that said Letters Patent is hereby corrected as shown below:

Specification

Column 1, line 8 insert --This application claims the benefit under 35 U.S.C. §119 (e) of U.S. Provisional Application No. 61/584,369, filed on January 9, 2012, which application is incorporated herein by reference in its entirety.--.

Column 1, line 28 delete "to magnetic" and replace with --to a magnetic--.

Column 1, line 30 delete "to magnetic" and replace with --to a magnetic--.

Column 1, line 50 delete "of magnetic" and replace with --of a magnetic--.

Column 3, line 1 delete "signal and" and replace with --signals and--.

Column 9, line 31 delete "ones the" and replace with --ones of the--.

Column 10, line 55 delete "one the" and replace with --one of the--.

Column 11, line 44 delete "one Hall" and replace with --one of the Hall--.

Column 11, line 50 delete "one the" and replace with --one of the--.

Column 12, line 39 delete "96d, 96" and replace with --96d, 96e--.

Column 12, line 67 delete "one Hall" and replace with --one of the Hall--.

Column 13, line 6 delete "one the" and replace with --one of the--.

Column 14, line 7 delete "92c" and replace with --98c--.

Signed and Sealed this
Twenty-third Day of August, 2016

Michelle K. Lee
*Director of the United States Patent and Trademark Office*

CERTIFICATE OF CORRECTION (continued)

U.S. Pat. No. 9,046,383 B2

Column 14, line 20 delete "one the" and replace with --one of the--.

Column 14, line 30 delete "one the" and replace with --one of the--.

Column 15, line 40 delete "one the" and replace with --one of the--.

Column 15, line 43-44 delete "one Hall" and replace with --one of the Hall--.

Column 15, line 50 delete "one the" and replace with --one of the--.

Column 16, line 53 delete "one the" and replace with --one of the--.

Column 16, line 57 delete "one Hall" and replace with --one of the Hall--.

Column 16, line 62 delete "one the" and replace with --one of the--.

Column 18, line 43 delete "1322aa" and replace with --132a--.

Column 24, line 19 delete "element" and replace with --elements--.

Column 24, line 40 delete "and equality" and replace with --an equality--.

Column 25, line 2-3 delete "is s difference" and replace with --is a difference--.

Column 25, line 9-10 delete "is s difference" and replace with --is a difference--.

Column 25, line 22 delete "17A" and replace with --17A.--.

Column 26, line 13 delete "is s" and replace with --is a--.

Column 26, line 20 delete "is s" and replace with --is a--.

Column 27, line 45 delete "arraignment" and replace with --arrangement--.

Column 27, line 53 delete "that that" and replace with --that the--.

Claims

Column 31, line 35, claim 33 delete "ones the" and replace with --ones of the--

Column 32, line 24, claim 38 delete ", and" and replace with --, an--.

Column 32, line 65, claim 45 delete "farther" and replace with --further--.

Column 33, line 19, claim 48 delete ". Wherein" and replace with --, wherein--.